US012281502B2

(12) United States Patent
Cappelli et al.

(10) Patent No.: US 12,281,502 B2
(45) Date of Patent: Apr. 22, 2025

(54) LOAD EQUALIZER FOR LATCHES OF CLOSURE PANELS IN MOTOR VEHICLES

(71) Applicant: MAGNA CLOSURES INC., Newmarket (CA)

(72) Inventors: Mario Cappelli, San Giuliano Terme (IT); Sandro Bertini, Liverno (IT); Francesco Cumbo, Pisa (IT)

(73) Assignee: MAGNA CLOSURES INC., Newmarket (CA)

( * ) Notice: Subject to any disclaimer, the term of this patent is extended or adjusted under 35 U.S.C. 154(b) by 1042 days.

(21) Appl. No.: 16/566,465

(22) Filed: Sep. 10, 2019

(65) Prior Publication Data

US 2020/0080348 A1 Mar. 12, 2020

Related U.S. Application Data

(60) Provisional application No. 62/851,916, filed on May 23, 2019, provisional application No. 62/730,244, filed on Sep. 12, 2018.

(51) Int. Cl.
*E05B 81/20* (2014.01)
*E05B 79/20* (2014.01)
(Continued)

(52) U.S. Cl.
CPC .............. *E05B 81/64* (2013.01); *E05B 79/20* (2013.01); *E05B 81/06* (2013.01); *E05B 81/20* (2013.01);
(Continued)

(58) Field of Classification Search
CPC .......... E05B 79/10; E05B 79/20; E05B 79/22; E05B 83/38; E05B 53/003; E05B 53/005; E05C 9/20; E05C 9/22
(Continued)

(56) References Cited

U.S. PATENT DOCUMENTS 5,829,314 A * 11/1998 Scura .................... B62M 25/04 188/24.11
6,125,583 A * 10/2000 Murray .................. E05B 81/20 49/360
(Continued)

FOREIGN PATENT DOCUMENTS

AU 2016102099 A4 2/2017
CA 2288225 C 8/2005
(Continued)

*Primary Examiner* — Alyson M Merlino

(57) ABSTRACT

A load balancing mechanism for controlling concurrent operation of a pair of latches of a vehicle via a respective pair of links connecting the pair of latches to an actuator, the actuator for sharing by the pair of latches, the load balancing mechanism comprising: a housing for connecting to a body of the vehicle; a lever mounted to the housing at a pivot such that the lever is pivotable about the pivot; an actuator mounting point on the lever connecting the lever to the actuator, the actuator for rotating the lever about the pivot; and a load balancing element mounted on the lever at an axis and rotatable about the axis, such that each of the respective pair of links is positioned on opposite sides of the axis, said each of the respective pair of links for coupling to a corresponding one of the pair of latches; wherein operation of the actuator causes both rotation of lever about the pivot and rotation of the load balancing element about the axis while the pair of latches are operated concurrently. A power cinch system and a power release system can be included.

20 Claims, 30 Drawing Sheets

(51) Int. Cl.

| | |
|---|---|
| ***E05B 81/06*** | (2014.01) |
| ***E05B 81/36*** | (2014.01) |
| ***E05B 81/64*** | (2014.01) |
| ***E05B 83/38*** | (2014.01) |
| ***E05B 85/26*** | (2014.01) |

(52) U.S. Cl.
CPC .............. *E05B 81/36* (2013.01); *E05B 85/26* (2013.01); *E05B 83/38* (2013.01)

(58) Field of Classification Search
USPC .............................................. 74/500.5, 501.5
See application file for complete search history.

(56) References Cited

U.S. PATENT DOCUMENTS

| | | | | | |
|---|---|---|---|---|---|
| 6,321,488 | B1 | 11/2001 | Bigoszewski et al. | | |
| 6,467,320 | B1 * | 10/2002 | Choo | E05B 83/16 | 292/DIG. 43 |
| 6,902,213 | B2 | 6/2005 | Lee | | |
| 6,913,309 | B2 * | 7/2005 | Mikolai | E05B 83/38 | 296/146.7 |
| 6,964,440 | B2 * | 11/2005 | Lebsack | E05B 79/20 | 292/336.3 |
| 7,182,392 | B2 * | 2/2007 | Sawajiri | E05B 83/38 | 292/64 |
| 7,547,056 | B2 * | 6/2009 | Waldner | E05B 79/20 | 292/DIG. 43 |
| 7,801,853 | B2 * | 9/2010 | Poechmueller | H04L 67/04 | 342/357.77 |
| 7,837,243 | B2 | 11/2010 | Stiglich | | |
| 8,894,103 | B2 * | 11/2014 | Shibayama | E05B 81/20 | 292/216 |
| 9,970,220 | B2 * | 5/2018 | Hiramoto | E05B 79/20 | |
| 2002/0063440 | A1 * | 5/2002 | Spurr | E05B 79/20 | 296/202 |
| 2016/0001642 | A1 | 1/2016 | Fortin | | |
| 2016/0017644 | A1 | 1/2016 | Okuma | | |
| 2016/0060922 | A1 | 3/2016 | Clark et al. | | |
| 2016/0186468 | A1 | 6/2016 | Ilea | | |
| 2017/0089103 | A1 | 3/2017 | Ottino et al. | | |
| 2017/0089105 | A1 | 3/2017 | Margheritti | | |
| 2018/0038139 | A1 * | 2/2018 | Zindler | E05B 79/20 | |
| 2018/0100331 | A1 | 4/2018 | Cumbo | | |
| 2019/0145135 | A1 | 5/2019 | Lebsak et al. | | |

FOREIGN PATENT DOCUMENTS

| | | | |
|---|---|---|---|
| CN | 102535993 | A | 7/2012 |
| CN | 202611382 | U | 12/2012 |
| CN | 108278053 | A | 7/2018 |
| EP | 2317043 | B1 | 10/2017 |
| KR | 20110032948 | A | 3/2011 |

* cited by examiner

LOAD EQUALIZER FOR LATCHES OF CLOSURE PANELS IN MOTOR VEHICLES

CROSS-REFERENCE TO RELATED APPLICATIONS

This application claims priority to U.S. Provisional Patent Application No. 62/730,244, filed on Sep. 12, 2018, and U.S. Provisional Patent Application No. 62/851,916, filed on May 23, 2019; the entire contents of which are hereby incorporated by reference herein.

FIELD

The present disclosure relates generally to door systems for motor vehicles. More particularly, the present disclosure relates to an opening system to operate a vehicle door.

BACKGROUND

This section provides background information related to door systems for motor vehicles which is not necessarily prior art to the inventive concepts associated with the present disclosure.

Some vehicle, such as pick-up trucks include a passenger cab having a rear seat positioned behind a front row of seats for accommodating additional passengers. These pick-up trucks typically include a third or fourth rear door located directly behind a front door to aid passengers when entering and exiting the rear seats. The rear door also provides convenient access to the space behind the front row of seats during loading and unloading of items.

In certain pick-up trucks, the front and rear doors swing open in opposite directions from one another, historically referred to as a "clamshell design". These pick-up trucks generally include an inside handle mounted along an inner surface of the rear door for actuation from inside the motor vehicle. In addition, a second handle is provided along a forward vertical edge of the rear door for actuation from outside the motor vehicle.

In the vehicle doors, there is closing assistance systems commonly referred to as power cinch function or soft close function. The trend of vehicle design is to improve accessibility and this can be accommodated for by eliminating the B pillar and/or in situations where adequate support portions of the vehicle body are minimized (e.g. for sliding cargo doors). For example, without the B pillar, there is the need to have multiple latches, e.g. one in the bottom or in the middle of the door and the another one in the upper position of the door, since stiffness without the B pillar is not enough to facilitate proper sealing of the door (when closed) by using only one latch. With two latches and cinch function, needed to close both latches is via the use of multiple remote actuators. Further, it is recognized that with remote actuators for two or more latches, the travel and force pertaining to simultaneous actuation of the multiple latches must consider variability in travel and seal load.

While current door systems are sufficient to meet all regulatory requirements and provide the desired levels of comfort and convenience, a need exists to continue development of advanced technology and provide alternative arrangements and features that provide enhanced safety, comfort and convenience to the user.

SUMMARY

This section provides a general summary of the inventive concepts associated with the present disclosure. Accordingly, this section is not intended to be interpreted as a comprehensive and exhaustive listing of all features, aspects, objectives and/or advantages associated with the inventive concepts which are further described and illustrated in the following detailed description and the appended drawings.

It is an objective of the present disclosure to provide a load equalizer for a multiple latch system of a closure panel.

An aspect provided is a load balancing mechanism for controlling concurrent operation of a pair of latches of a vehicle via a respective pair of links connecting the pair of latches to an actuator, the actuator for sharing by the pair of latches, the load balancing mechanism including: a housing for connecting to a body of the vehicle; a lever mounted to the housing at a pivot such that the lever is pivotable about the pivot; an actuator mounting point on the lever connecting the lever to the actuator, the actuator for rotating the lever about the pivot; and a load balancer element mounted on the lever at an axis and rotatable about the axis, such that each of the respective pair of links is positioned on opposite sides of the axis, the each of the respective pair of links for coupling to a corresponding one of the pair of latches; wherein operation of the actuator causes both rotation of lever about the pivot and rotation of the load balancer element about the axis while the pair of latches are operated concurrently.

In accordance with another aspect, there is provided a system for controlling movement of a closure member, the system including an actuator, at least two links each operably coupled to an actuatable closure device for moving the closure member in response to actuation of a respective one of the at least two links, and a load balancing mechanism coupled to the actuator and the at least two links, the load balancing mechanism configured to actuate the at least two links in response to actuation of the actuator and allow for a variation in the actuation travels between the at least two links in response to a resistance of one of the at least two links acting on the load balancing mechanism being different than a resistance of the other one of the at least two links acting on the load balancing mechanism. In a related aspect, the load balancing mechanism includes a balancer element, such that a difference in the resistance between the at least two links acting on the load balancing imparts a movement of the balancer element to allow for the variation in the actuation travels.

In accordance with another aspect, there is provided a vehicle closure member having an actuator mounted to the closure member, at least two links each operably coupled to an actuatable closure device for imparting a movement to the closure member in response to actuation of a respective one of the at least two links, and a load balancing mechanism mounted to the closure member and coupled to the actuator and the at least two links, the load balancing mechanism configured to actuate the at least two links in response to actuation of the actuator and allow for a variation in the actuation travels between the at least two links in response to a resistance of one of the at least two links acting on the load balancing mechanism being different than a resistance of the other one of the at least two links acting on the load balancing mechanism.

In accordance with another aspect, there is provided a load balancing mechanism for controlling concurrent operation of a pair of latches of a vehicle via a first pair of links connecting the pair of latches to an actuator, the actuator for sharing by the pair of latches, the load balancing mechanism including a housing for connecting to a body of the vehicle, a disengagement lever mounted to the housing at a pivot such that the disengagement lever is pivotable about the pivot, the actuator coupled to the disengagement lever for rotating the disengagement lever about the pivot, and a power cinch system having a system of levers connected to the disengagement lever, the system of levers also connected to a first cinch link coupled to a first latch and also connected to a second cinch link coupled to a second latch, the first latch and the second latch of the pair of latches and the first cinch link and the second cinch link of the first pair of links, wherein operation of the actuator causes operation of the system of levers while the pair of latches are operated concurrently by the first cinch link and the second cinch link. In accordance with a related aspect of the load balancing mechanism the system of levers are connected to the disengagement lever by a lever. In accordance with a related aspect, the system of levers includes a first lever connected by a first pivot to the lever at one end and to a fixed pivot connected to the housing at the other end, a second lever connected to the first lever at a second pivot connection between the first pivot and the fixed pivot, and a third lever connected to the fixed pivot and also connected to the second lever by a pin and slot connection adjacent to the second connection pivot, such that the first lever is connected to the first cinch link and the third lever is connected to the second cinch link. In accordance with a related aspect, the load balancing mechanism further includes a sector gear connected to the housing about the pivot and driven by the actuator, such that the sector gear is coupled to the disengagement lever by a hook element. In accordance with a related aspect, the hook element is coupled to the sector gear by a pivot connection and is also connected to the disengagement lever by an abutment mating with an abutment surface. In accordance with a related aspect, the abutment is mounted on the disengagement lever and the abutment surface is positioned on the hook element. In accordance with a related aspect, the load balancing mechanism further includes a power release system coupled to the sector gear, the power release system including a secondary hook element connected to the housing by a second pivot and connected to a second pair of links also connecting the pair of latches to the actuator, wherein the second pair of links has a first power link coupled to the first latch and a second release link coupled to the second latch, such that rotation of the sector gear causes movement of the secondary hook element about the second pivot in order to actuate the second pair of links. In accordance with another related aspect, the second hook element is coupled to the sector gear by an abutment interacting with an abutment surface. In accordance with another related aspect, the abutment is mounted on the sector gear and the abutment surface is positioned on the second hook element. In accordance with another related aspect, the movement of the sector gear by the actuator in a first direction causes movement of the disengagement lever about the pivot in order to operate the power cinch system while movement of the sector gear in a second direction causes movement of the sector gear in order to operate the power release system, such that the first direction is opposite to the second direction.

In accordance with another aspect, there is provided a method of operation of a load balancing mechanism including a disengagement lever mounted to a housing at a pivot and an actuator coupled to the disengagement lever for rotating the disengagement lever about the pivot, the method including the steps of actuating the actuator, pivoting the disengagement lever about the pivot by the actuator, manipulating a system of levers connected to the disengagement lever, the system of levers connected to a first latch by a first cinch link and to a second latch by a second cinch link the first cinch link and the second cinch link of a first pair of links and operating the first latch and the second latch concurrently by the pair of links during the manipulating.

In accordance with yet another aspect, there is provided a system for controlling movement of a closure member, the system including an actuator, at least two links each operably coupled to an actuatable closure device for moving the closure member in response to actuation of a respective one of the at least two links, and a load balancing mechanism coupled to the actuator and the at least two links, the load balancing mechanism configured to actuate the at least two links in response to actuation of the actuator and allow for a variation in the actuation travels between the at least two links in response to a resistance of one of the two links acting on the load balancing mechanism being different than a resistance of the other one of the two links acting on the load balancing mechanism.

In accordance with another aspect, there is provided a load balancing mechanism for controlling concurrent operation of at least a pair of latches of a vehicle via a respective at least pair of links connecting the at least pair of latches to an actuator, the actuator for sharing by the at least pair of latches, the load balancing mechanism including a housing for connecting to a body of the vehicle, and a load balancer element mounted to the housing and operably interposed between the actuator and the at least pair of links, the load balancer element having an input operably coupled to the actuator to receive an actuation force from the actuator and at least two outputs each operably coupled to one of the at least pair of links to distribute to the at least one pair of links each a portion of the actuation force, such that the operation of the actuator causes operation of the load balancer for driving the at least pair of links to cause operation of at least one of the pair of latches.

DRAWINGS

The drawings described herein illustrate at least one non-limiting embodiment associated with the present disclosure and are not intended to limit the scope of the present disclosure.

FIG. 1 is a perspective view of a motor vehicle equipped with a load balancing mechanism embodying the concepts of the present disclosure and including a plurality of cinch mechanisms of respective latches;

FIG. 2*a,b* show alternate internal views of a secondary door of the vehicle of FIG. 1;

FIG. 3 is a side view of a further embodiment of the motor vehicle of FIG. 1;

FIGS. 4*a,b* are interior view diagrams of a latching system with the load balancing mechanism for the motor vehicle of FIG. 1;

Figure 1:
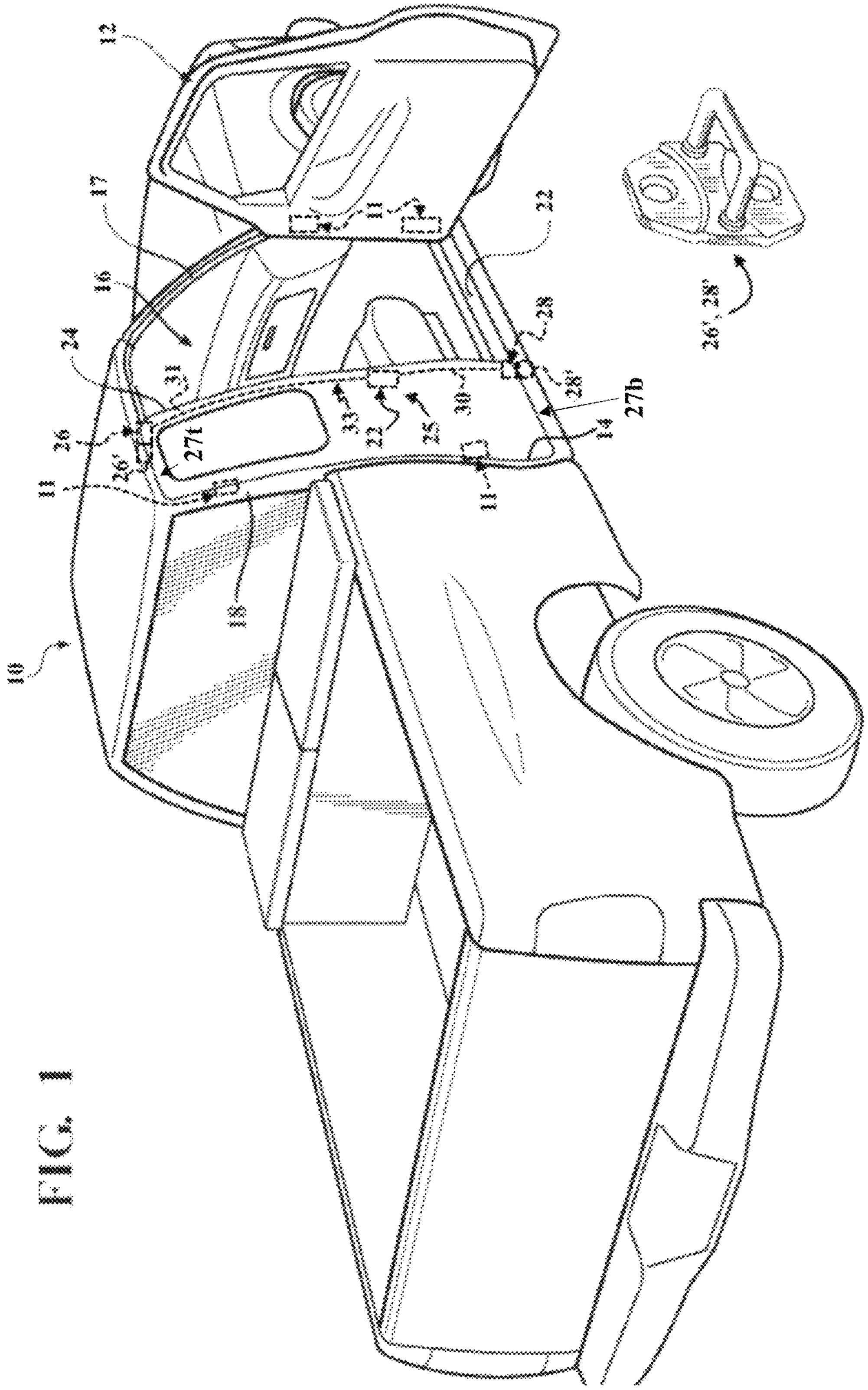
Figure 2B:
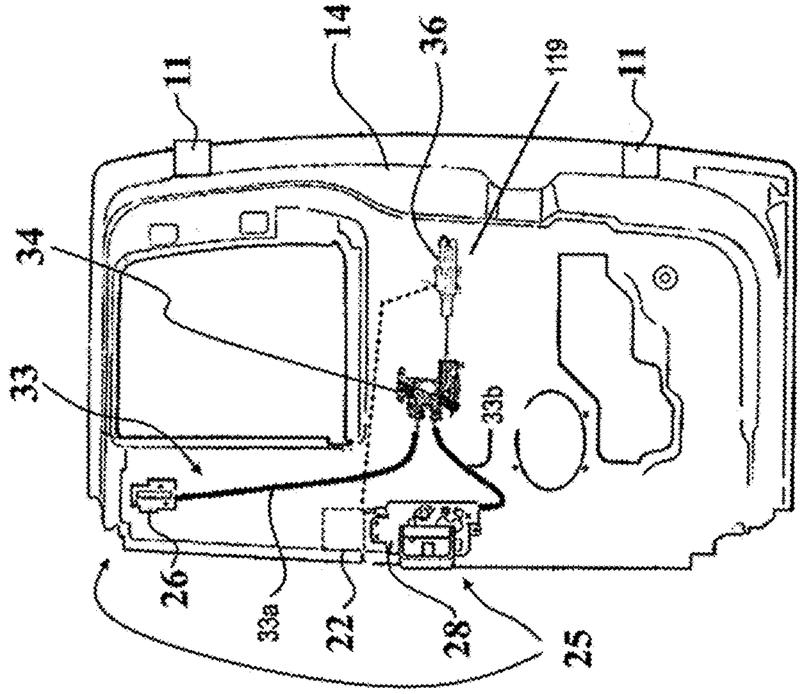
Figure 2A:
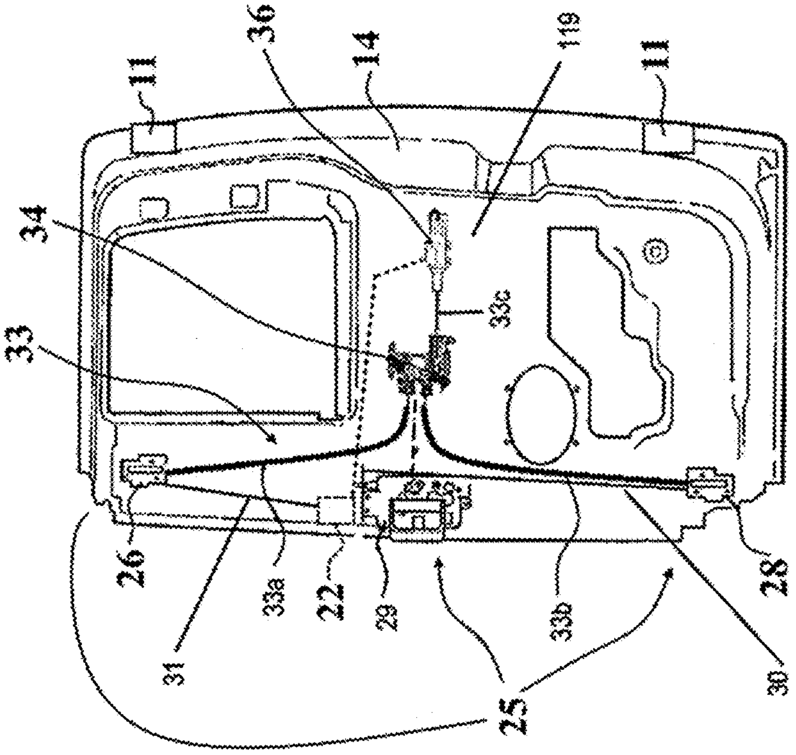
Figure 7:
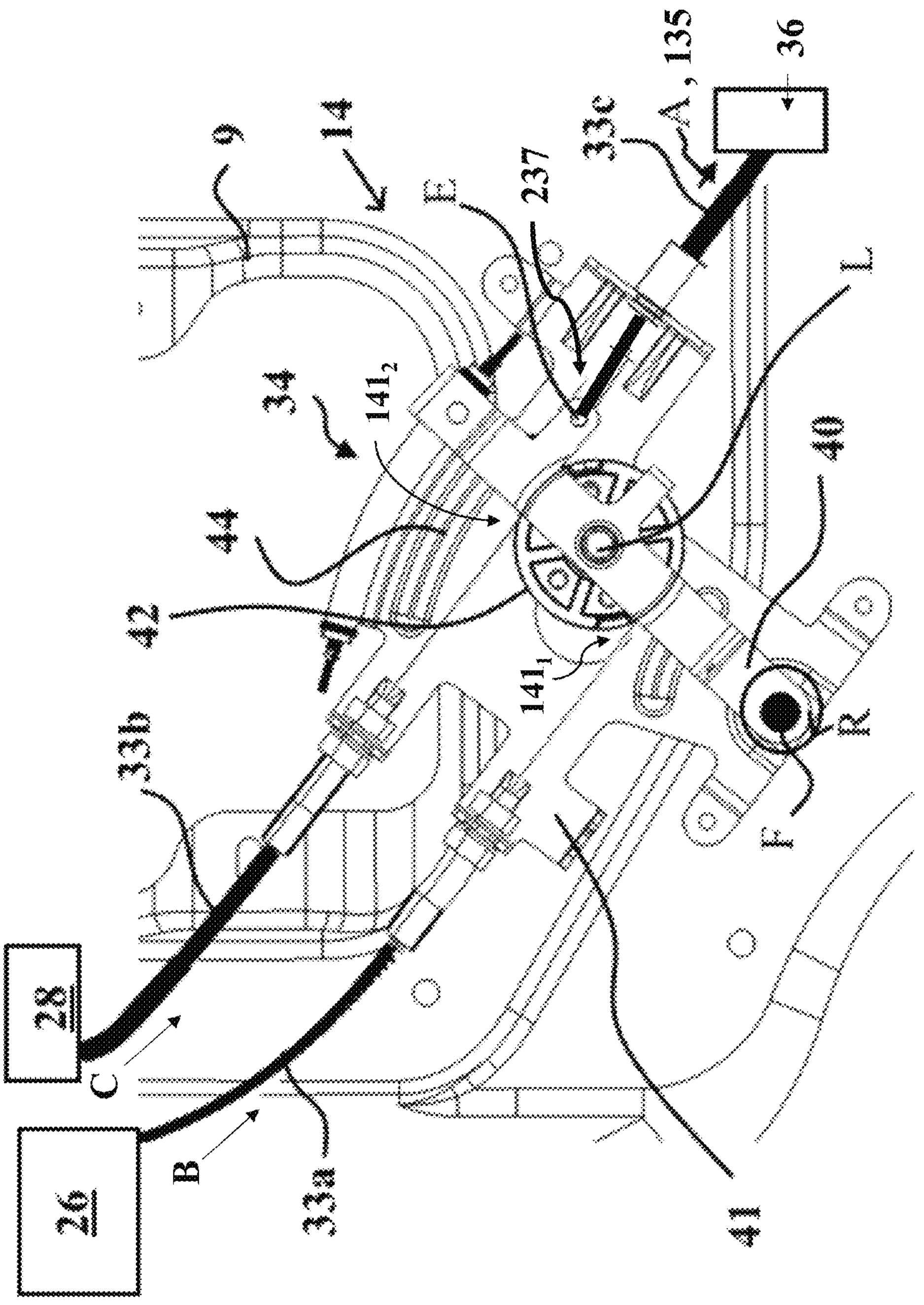
FIG. 7 is a further embodiment of the load balancing mechanism of FIG. 4.
Figure 8:
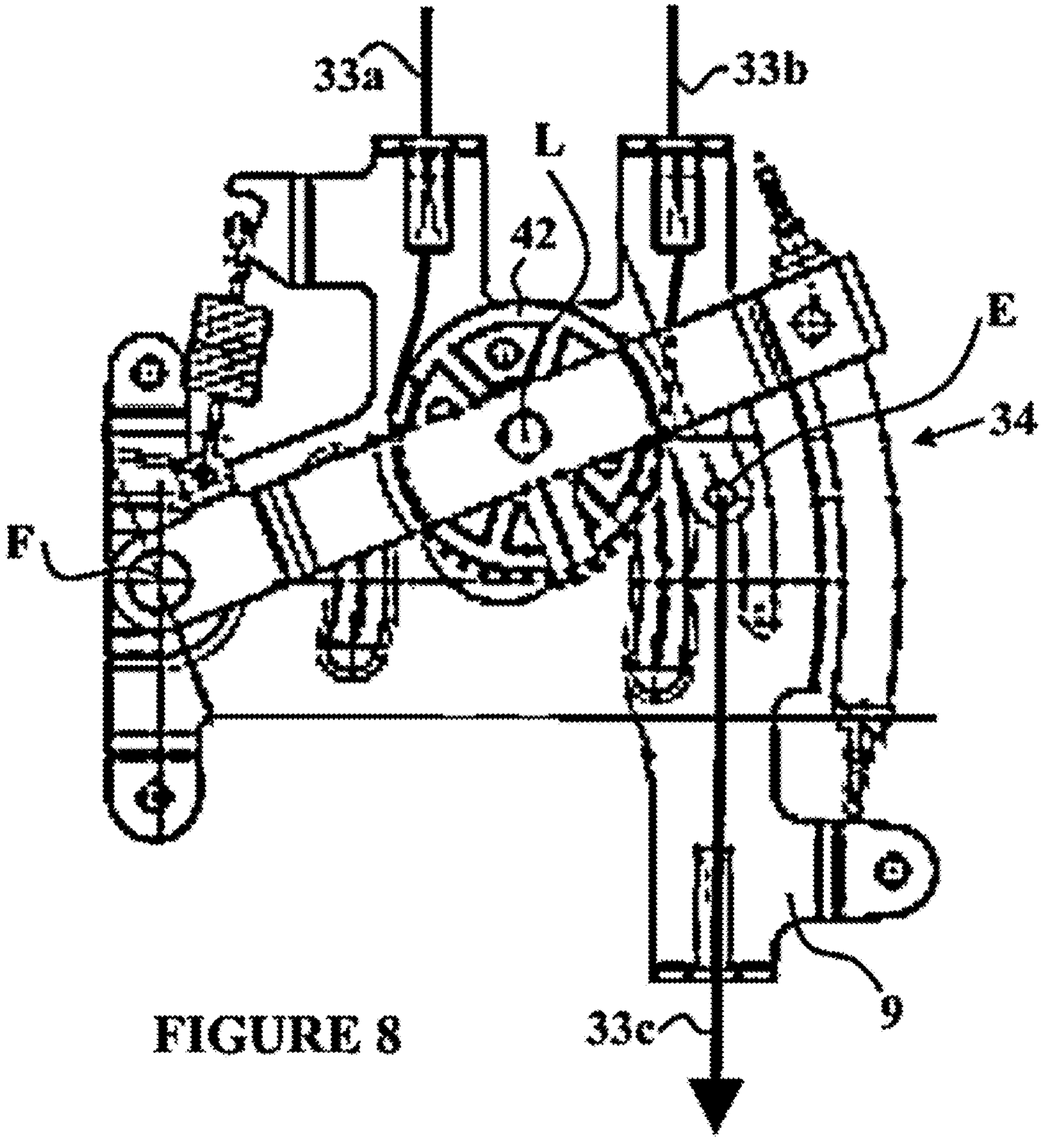
FIG. 8 is a start position of the load balancing mechanism of FIG. 7.
Figure 9:
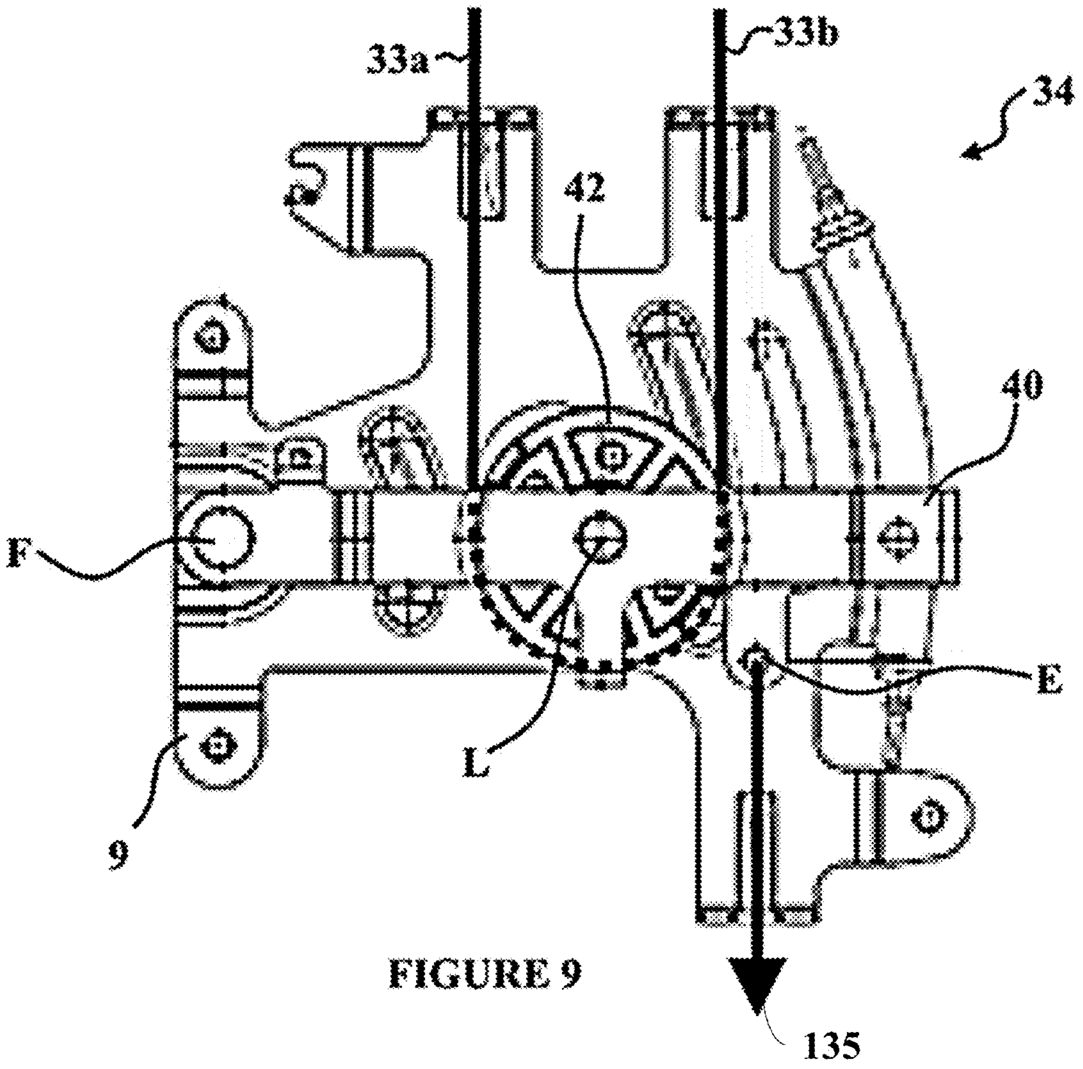
Figure 10:
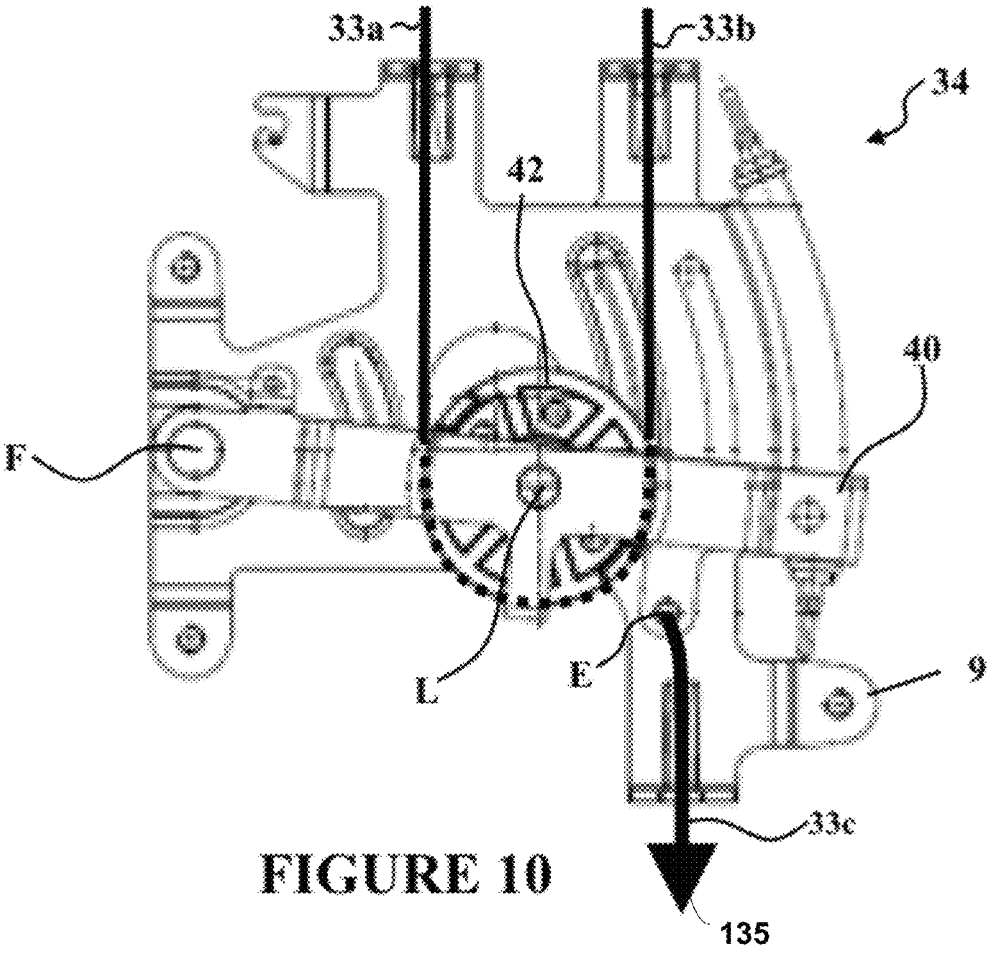
Figures 8A, 9A, 10A:
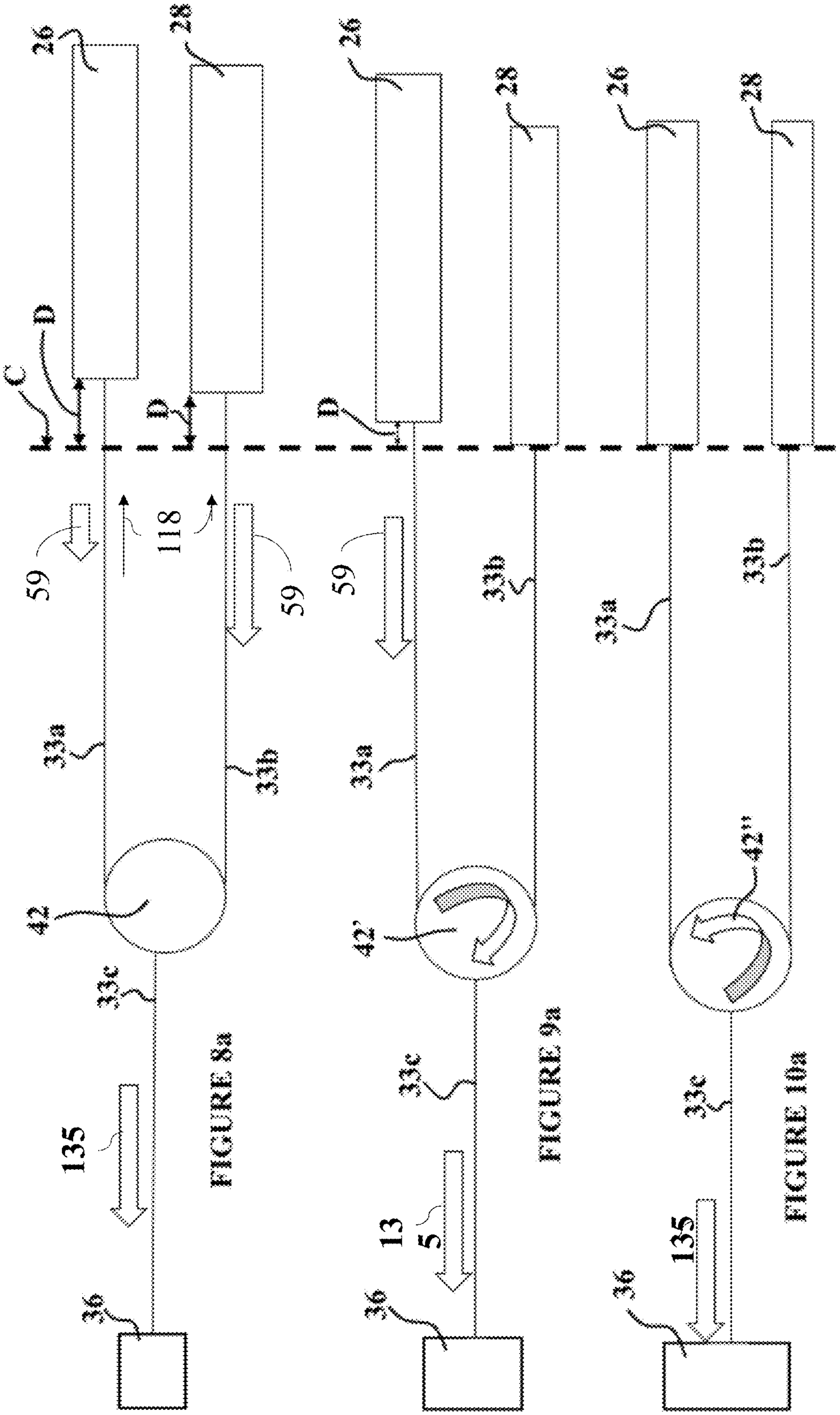
Figure 11:
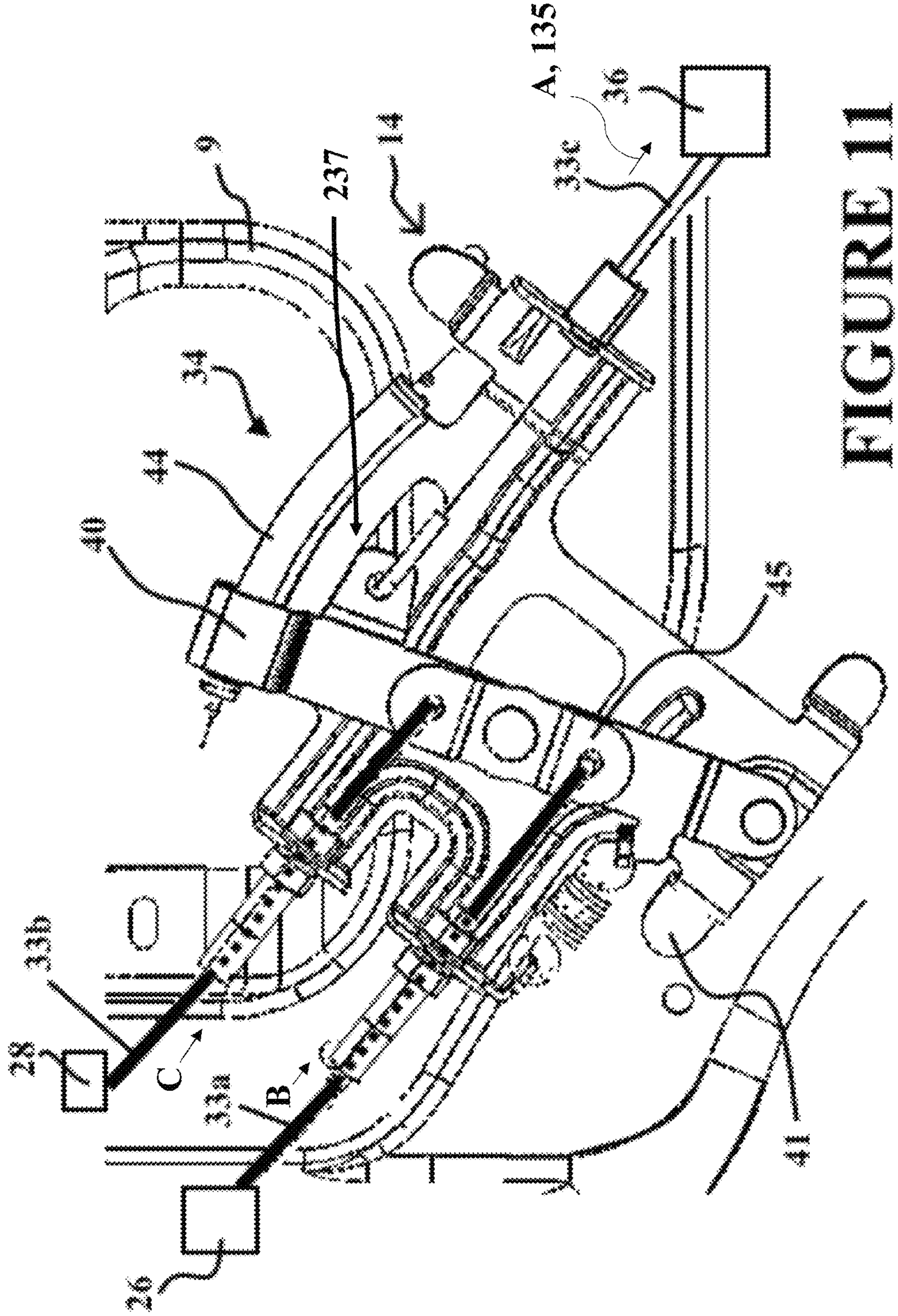
Figure 12:
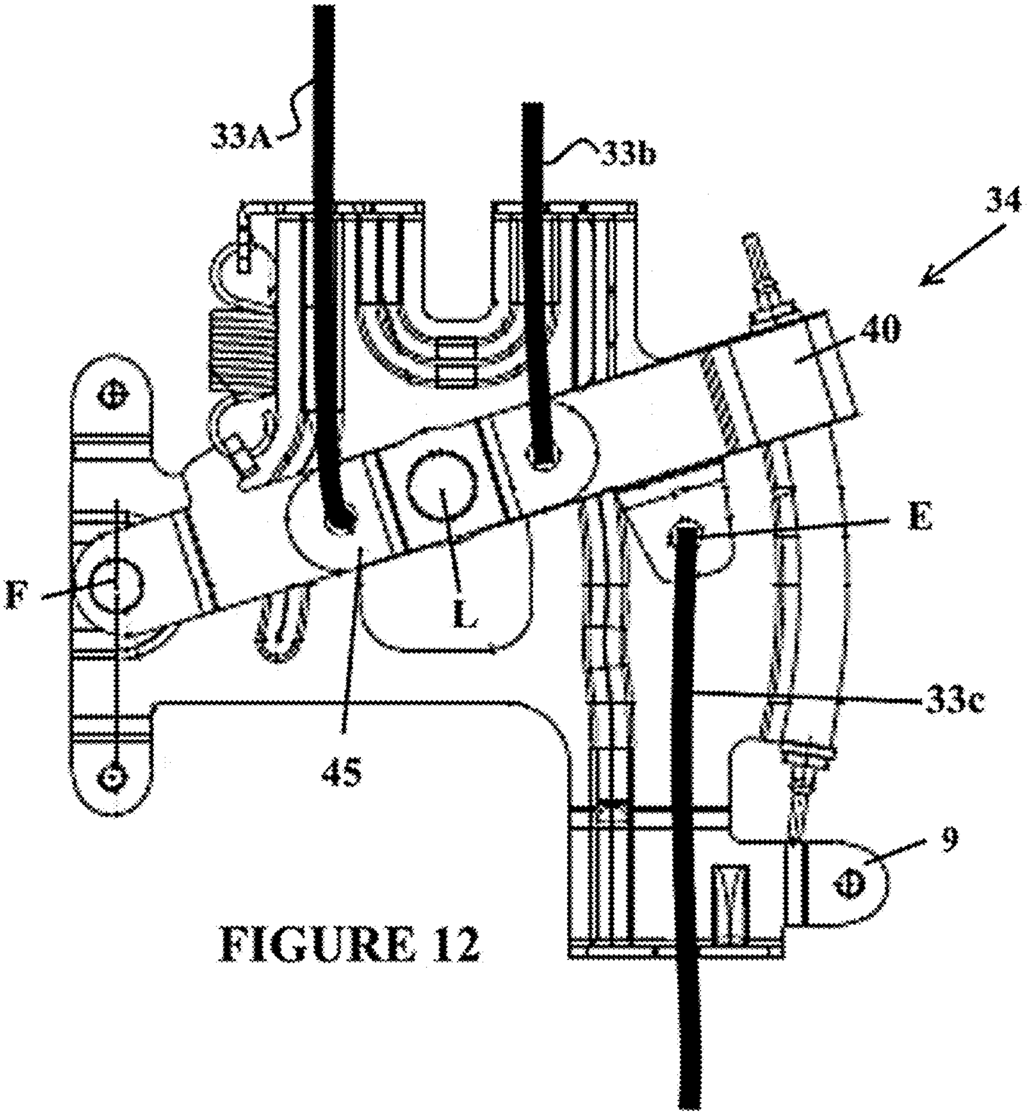
Figure 13:
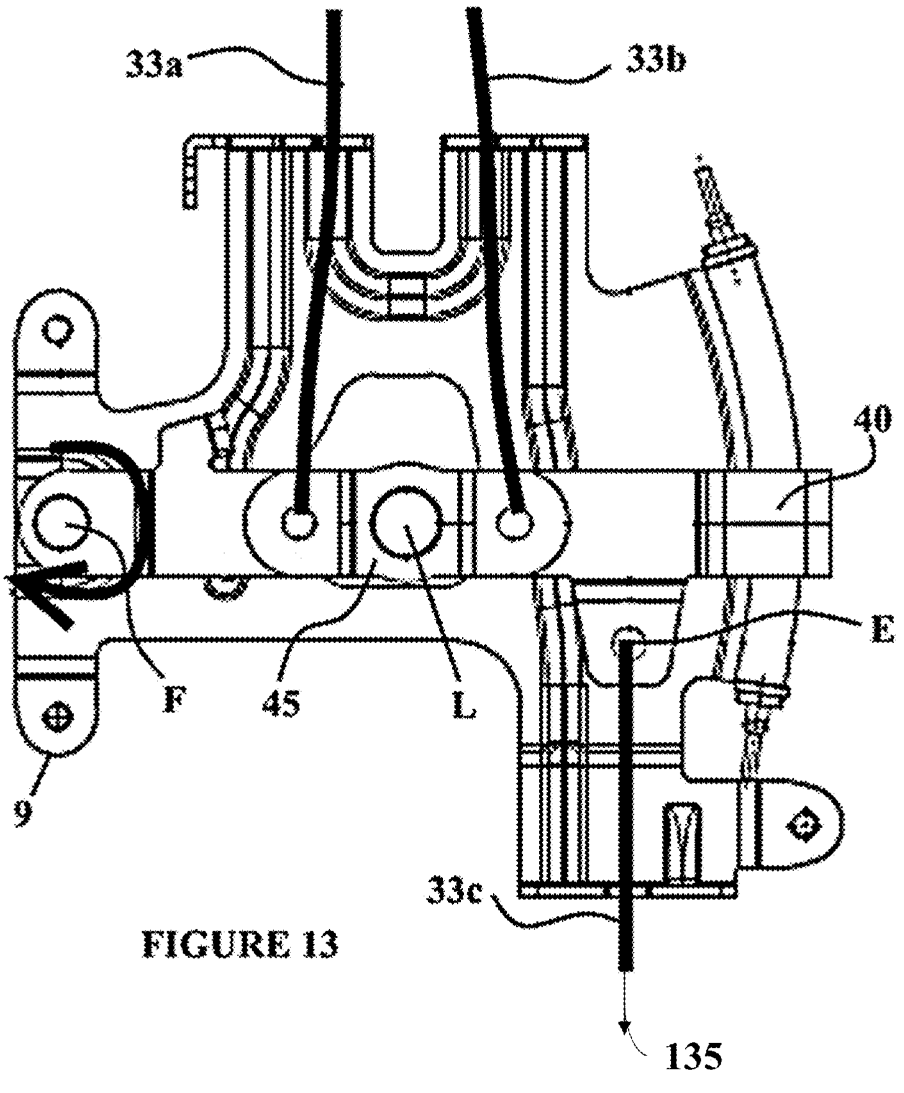
Figure 14:
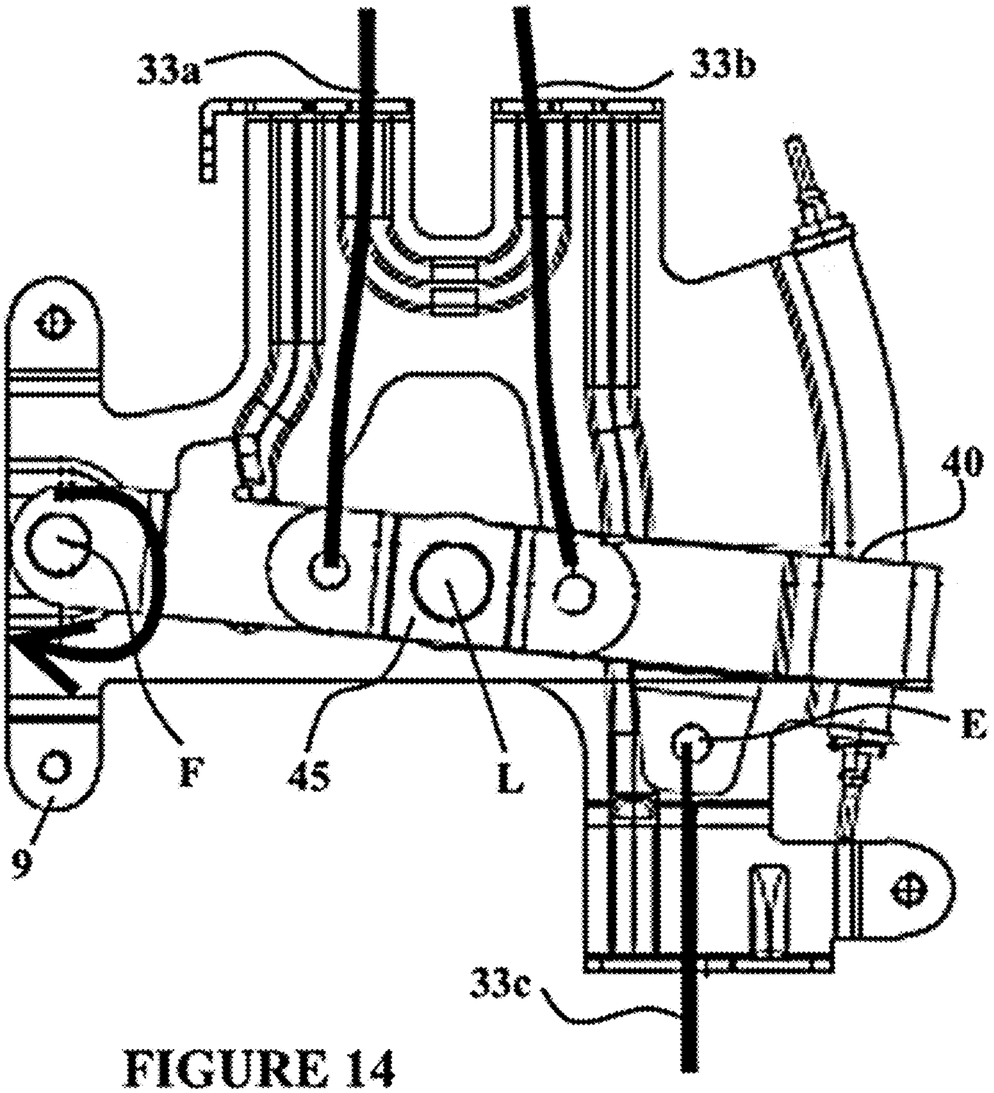
Figures 12A, 13A, 14A:
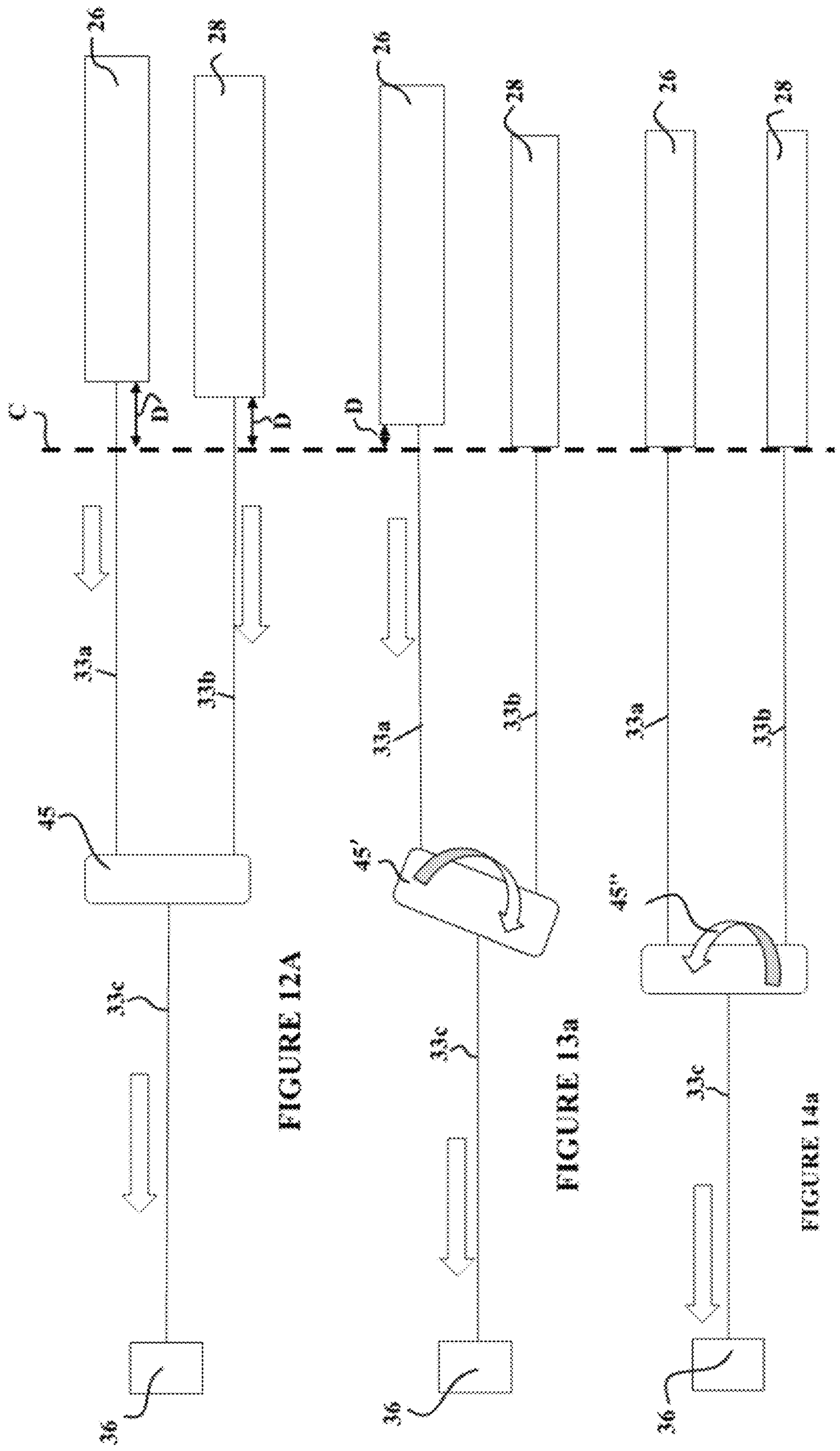
Figure 15:
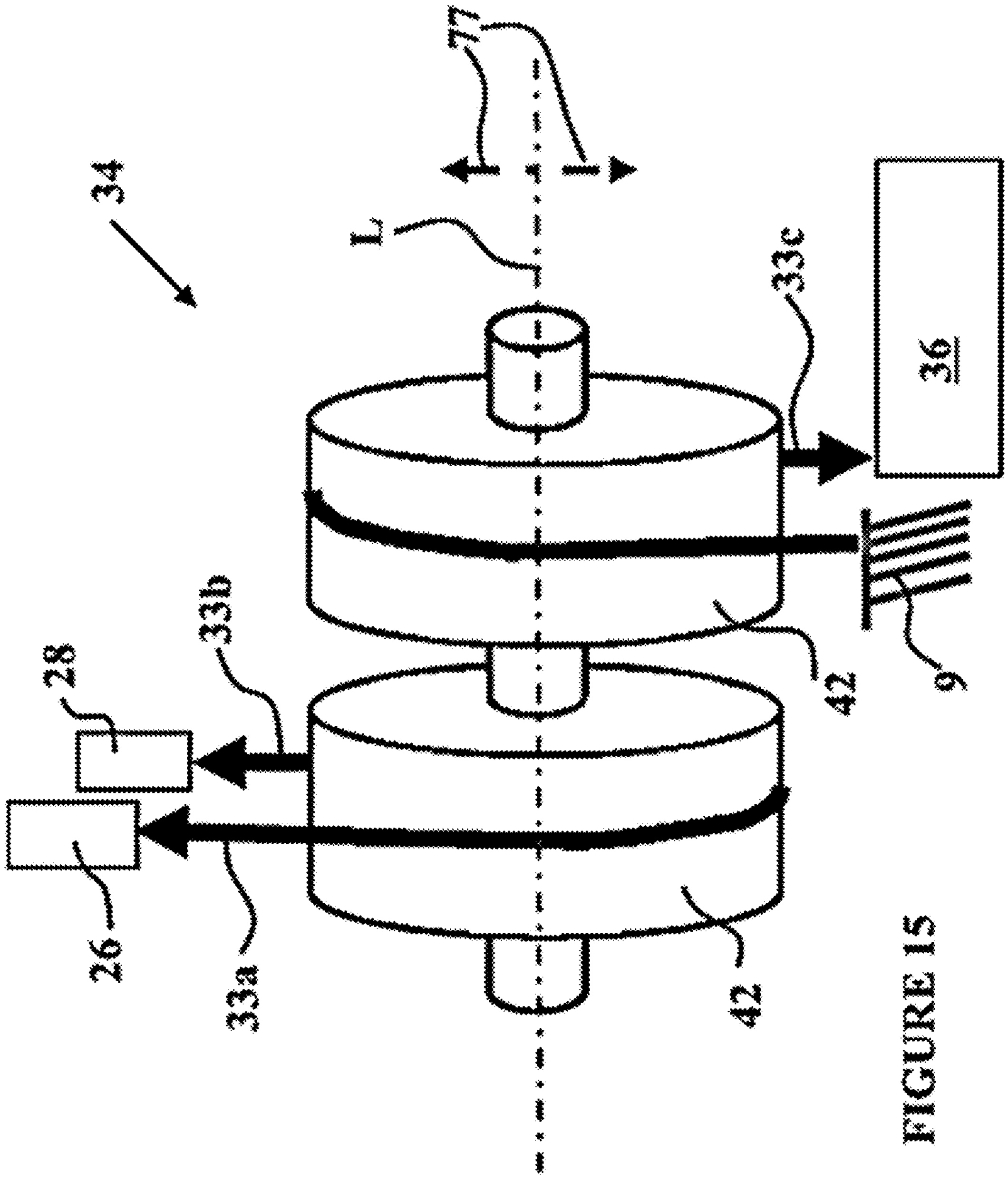
Figure 16:
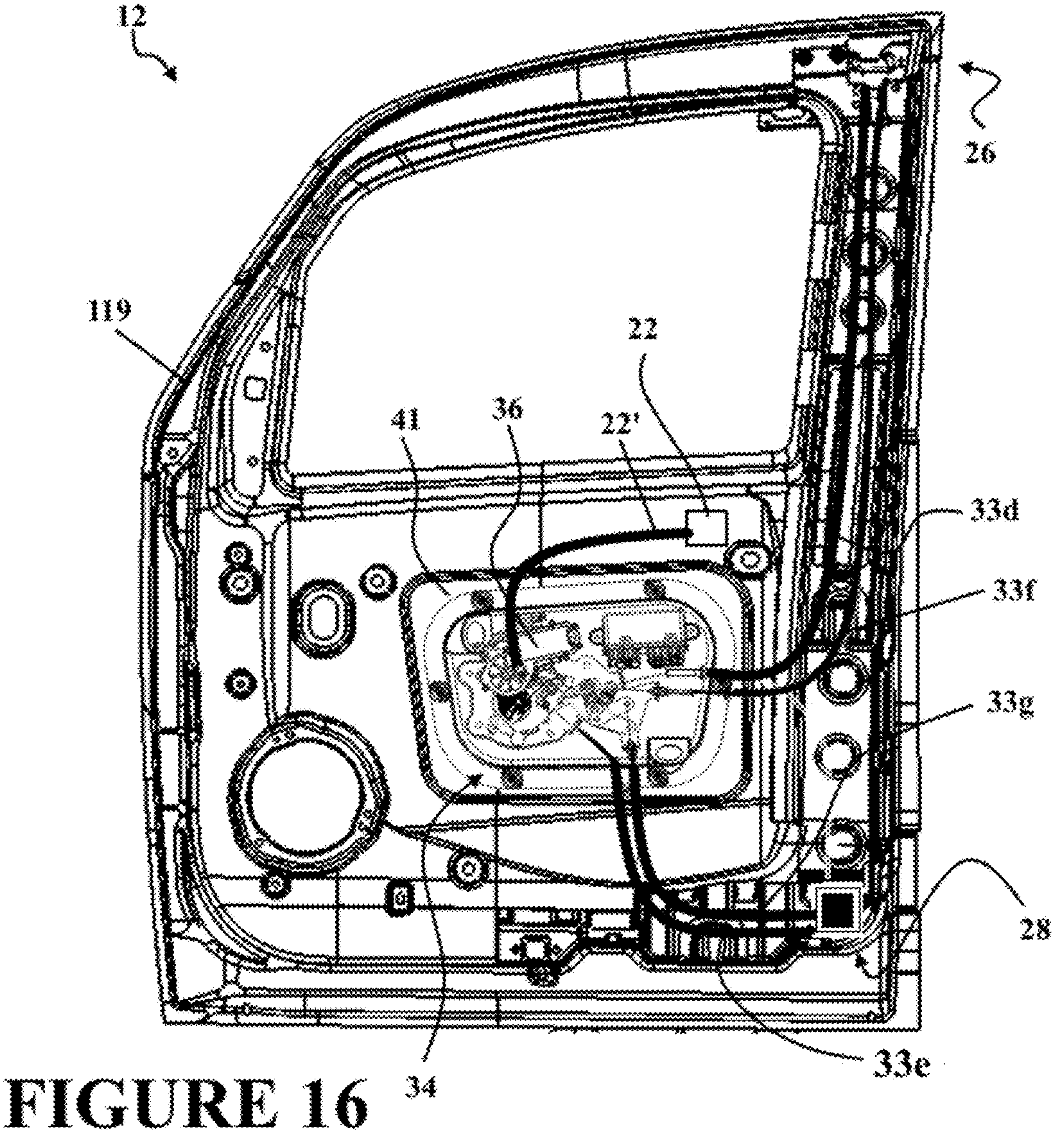
Figure 17:
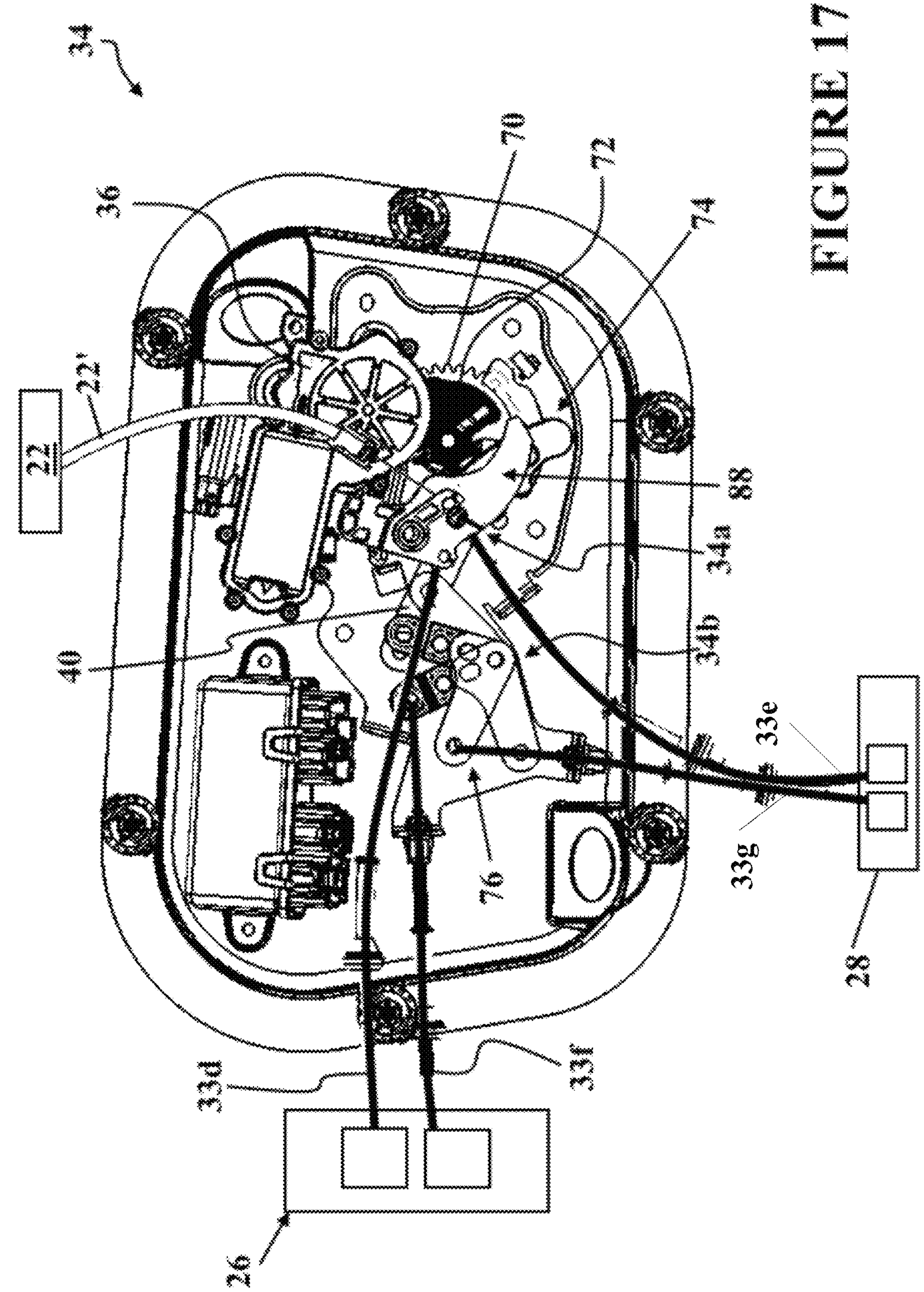
Figure 18:
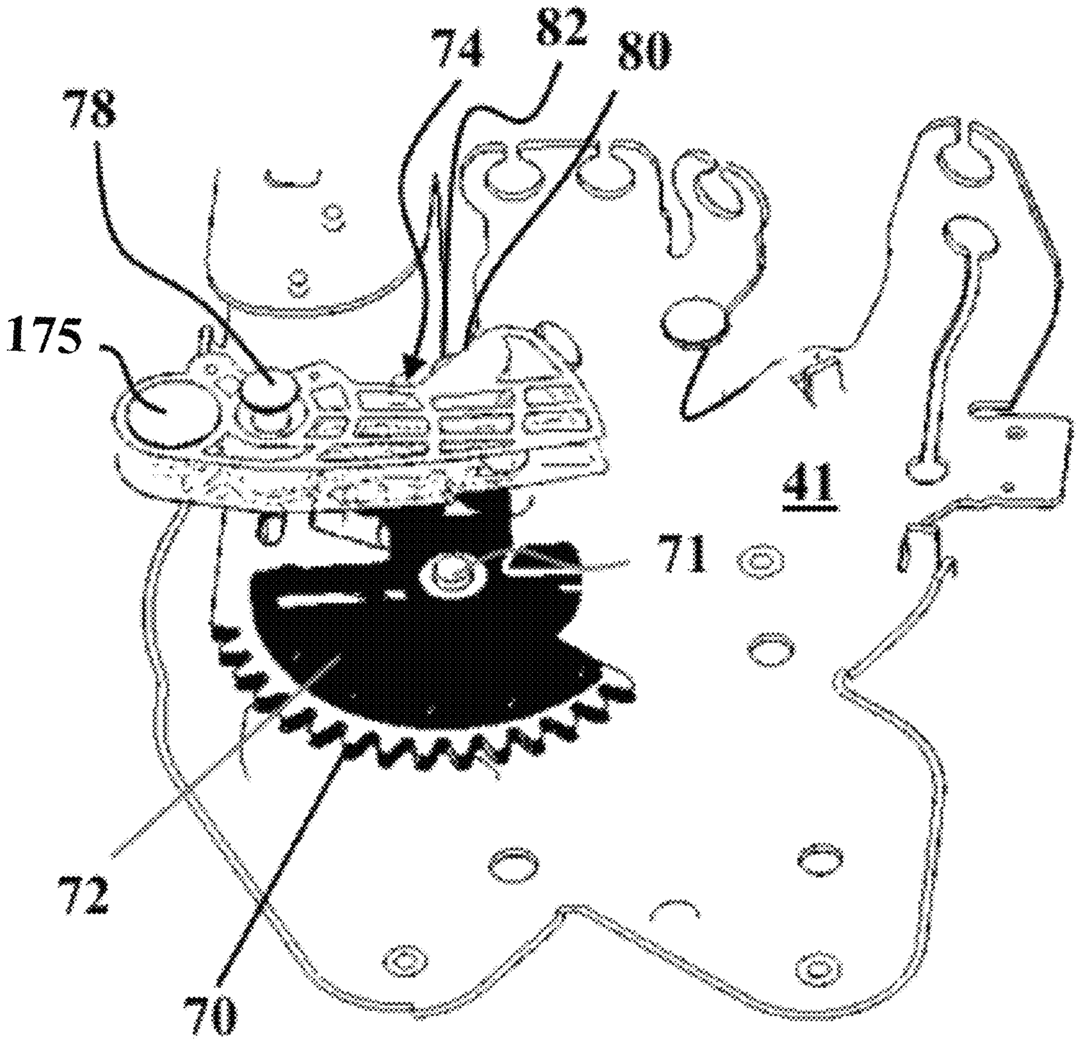
Figure 19B:
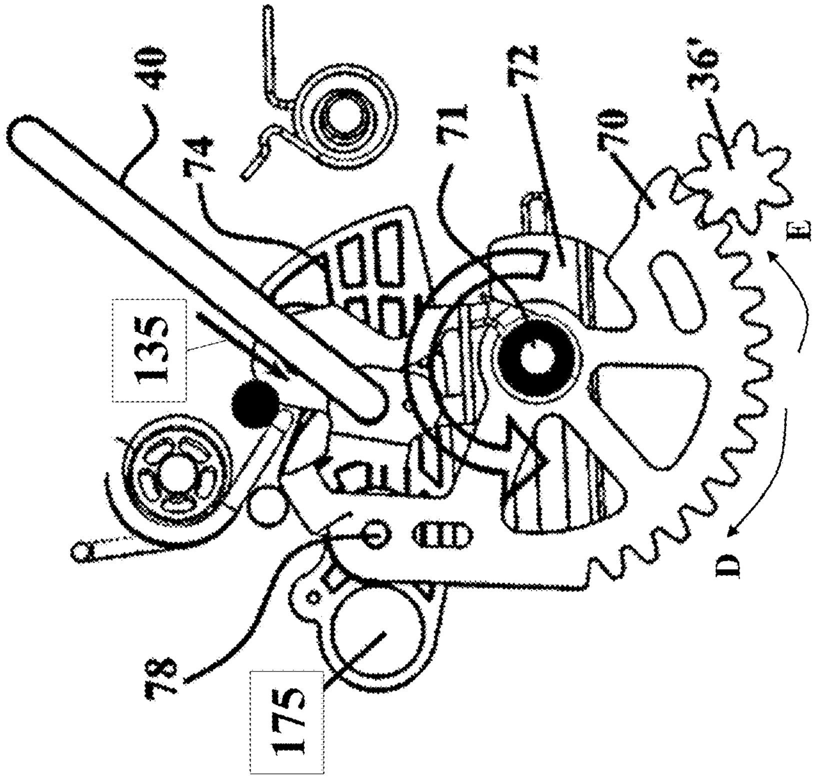
Figure 19A:
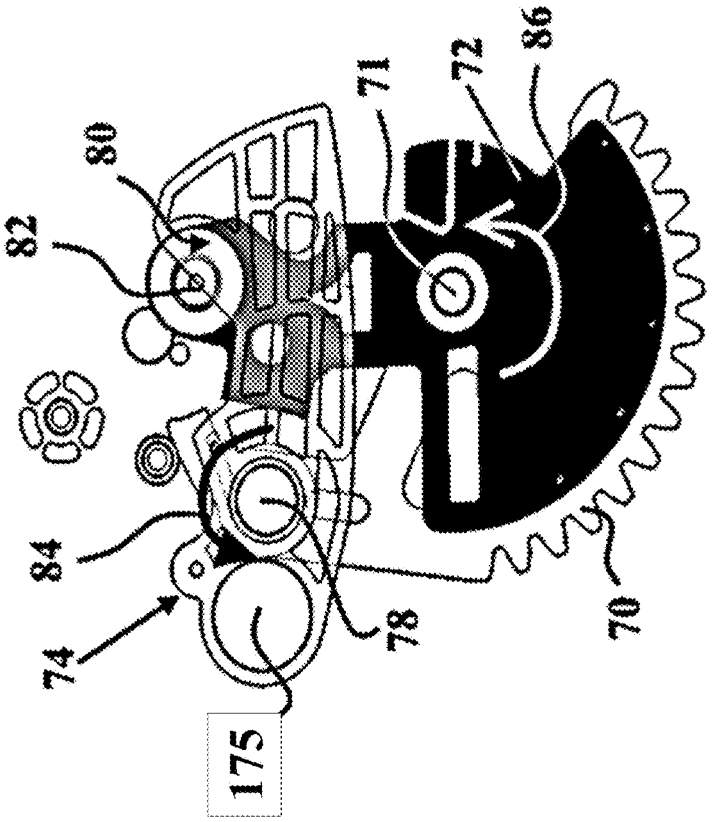
Figure 20B:
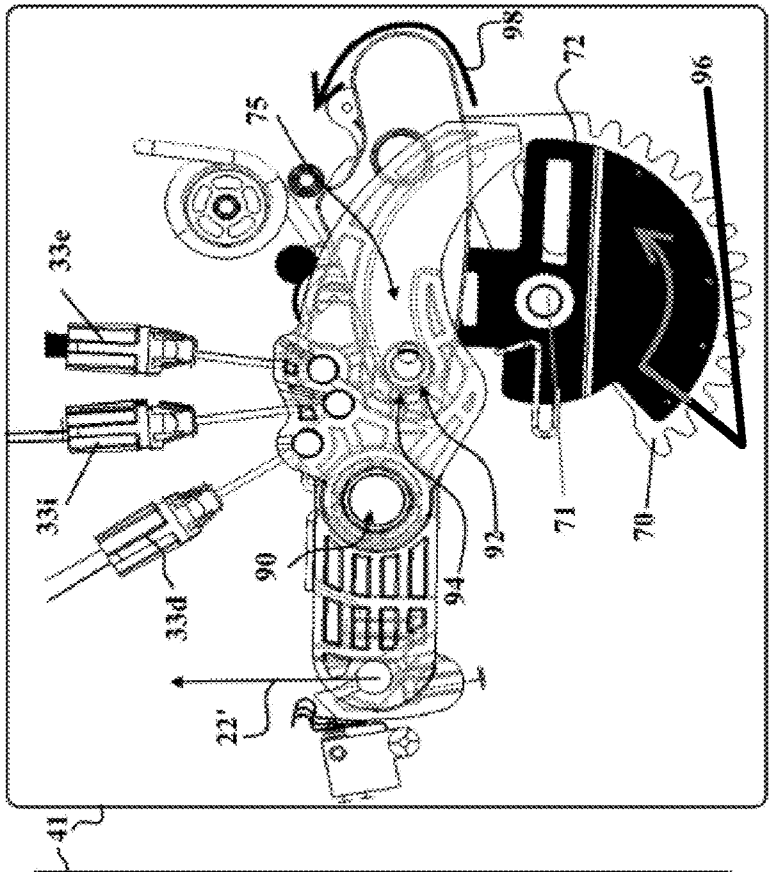
Figure 20A:
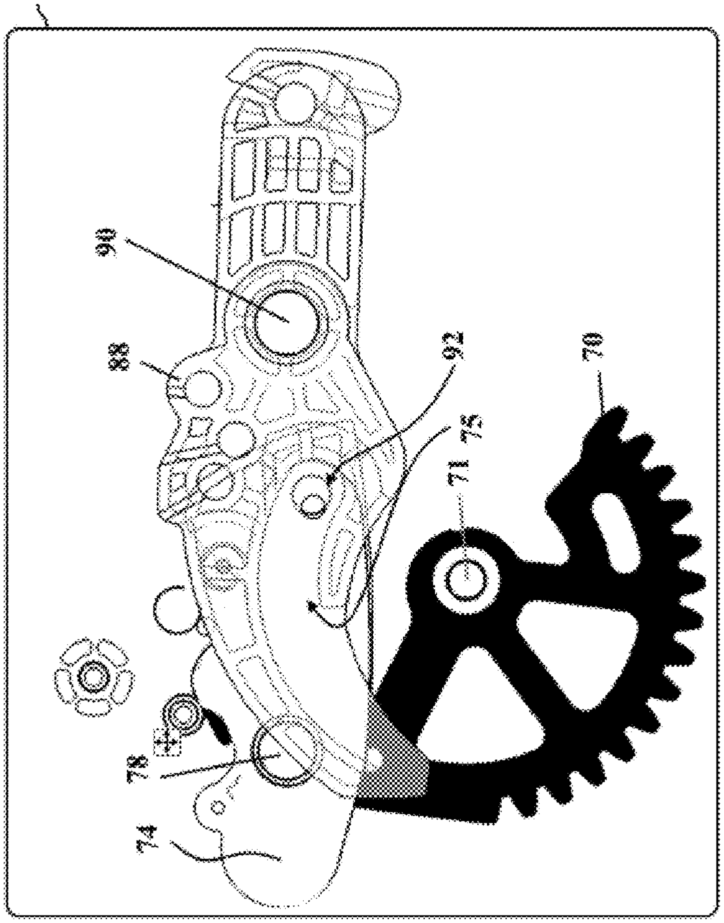
Figure 21:
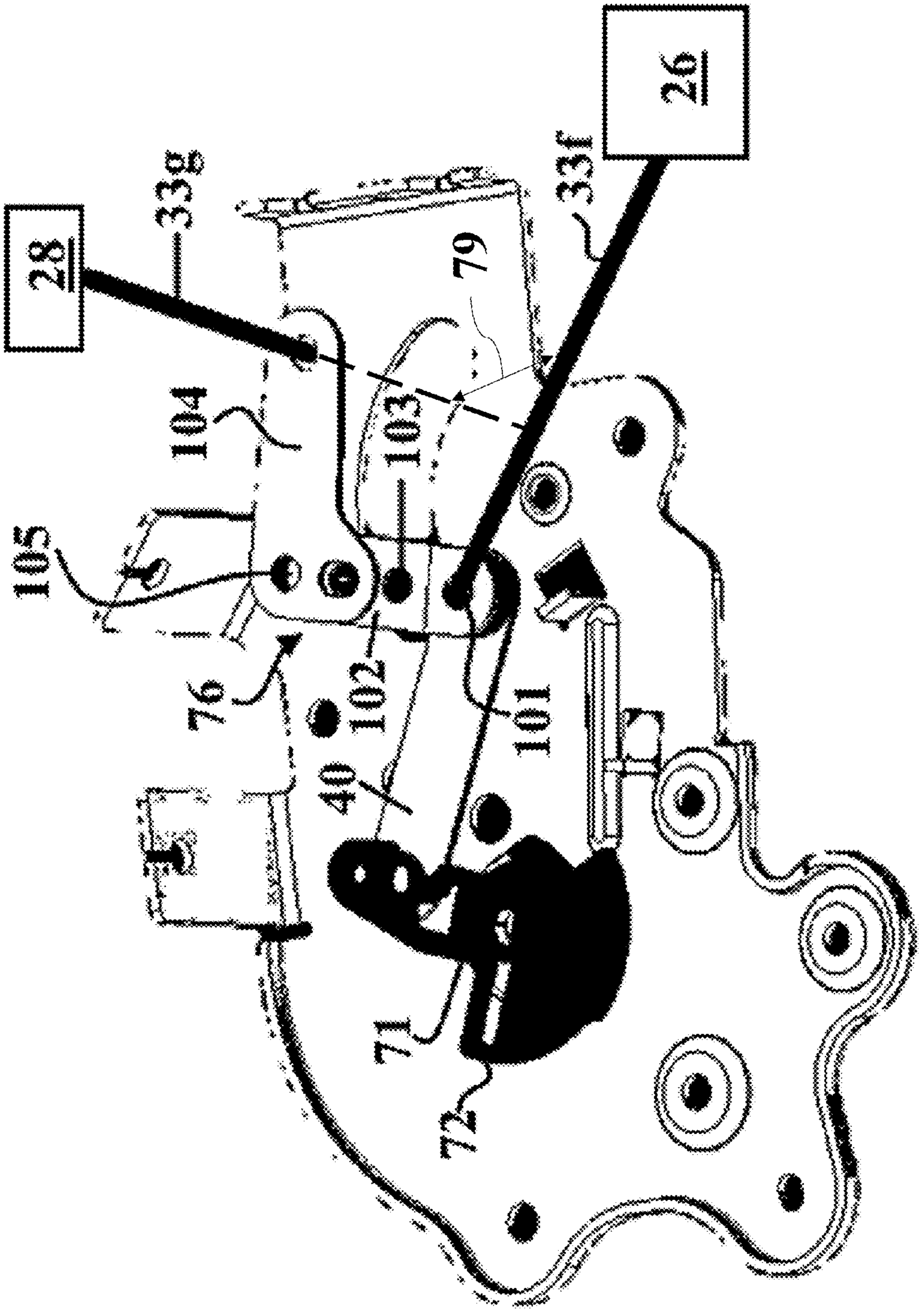
Figure 22:
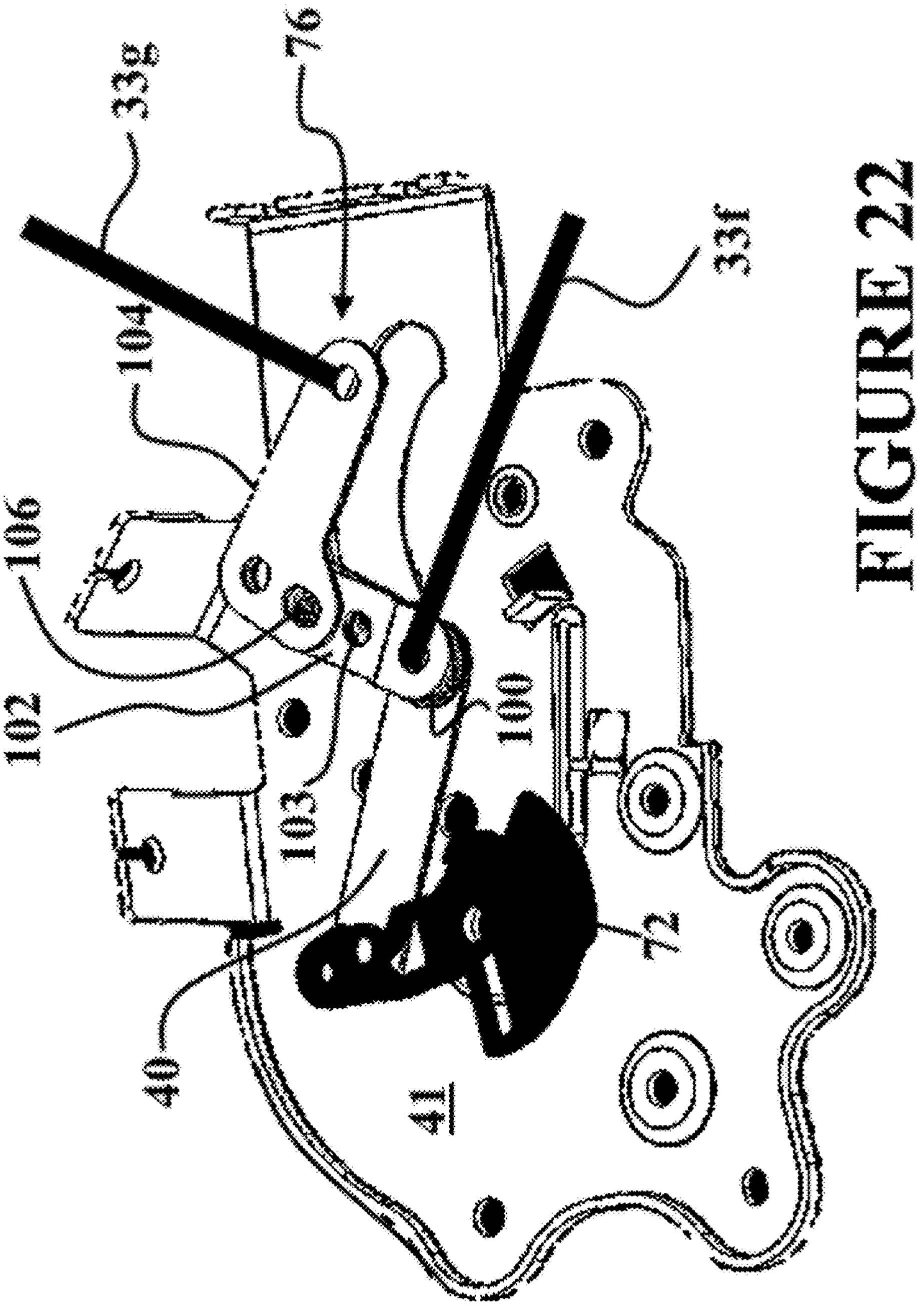
Figure 23:
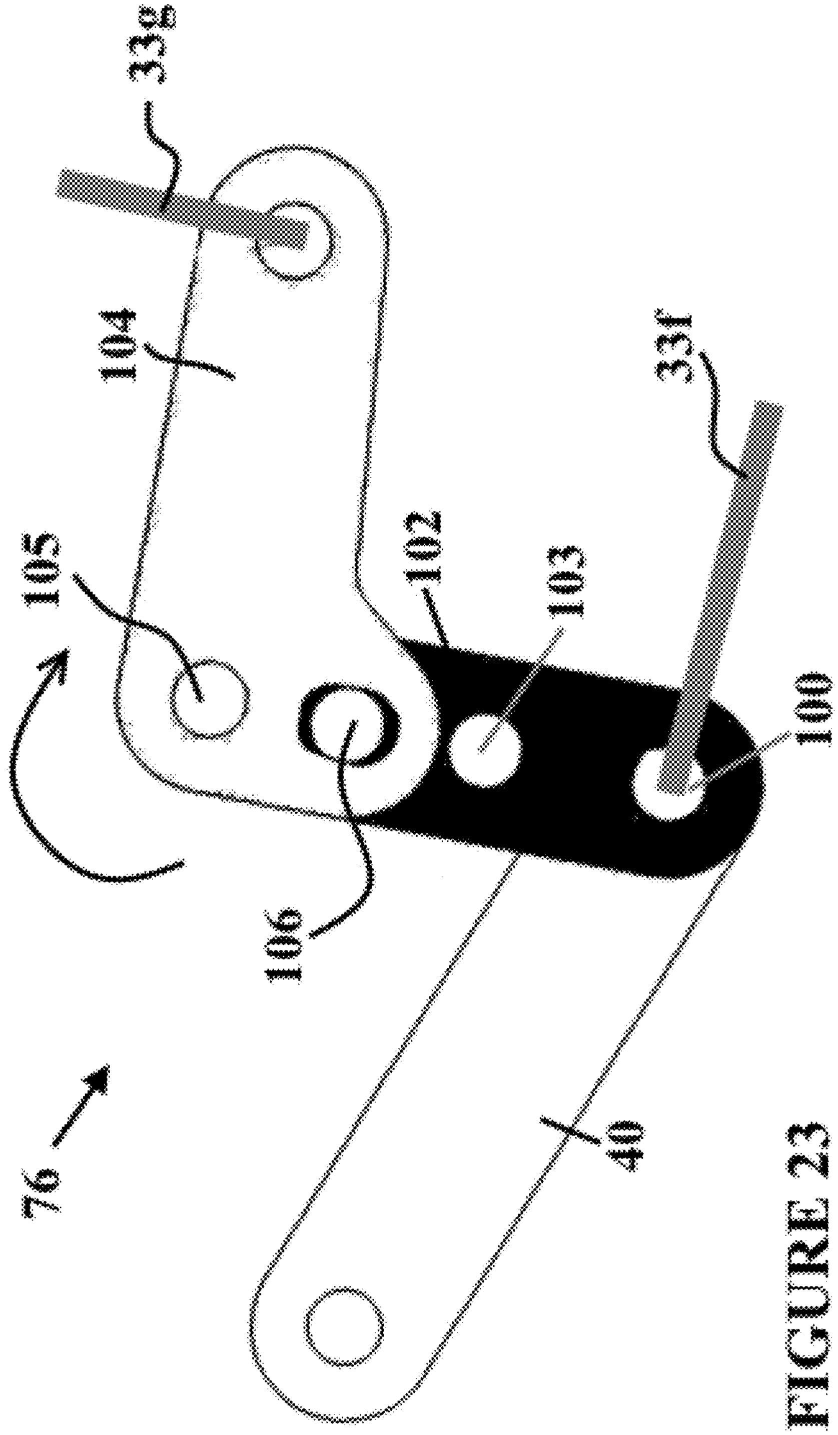
Figure 24:
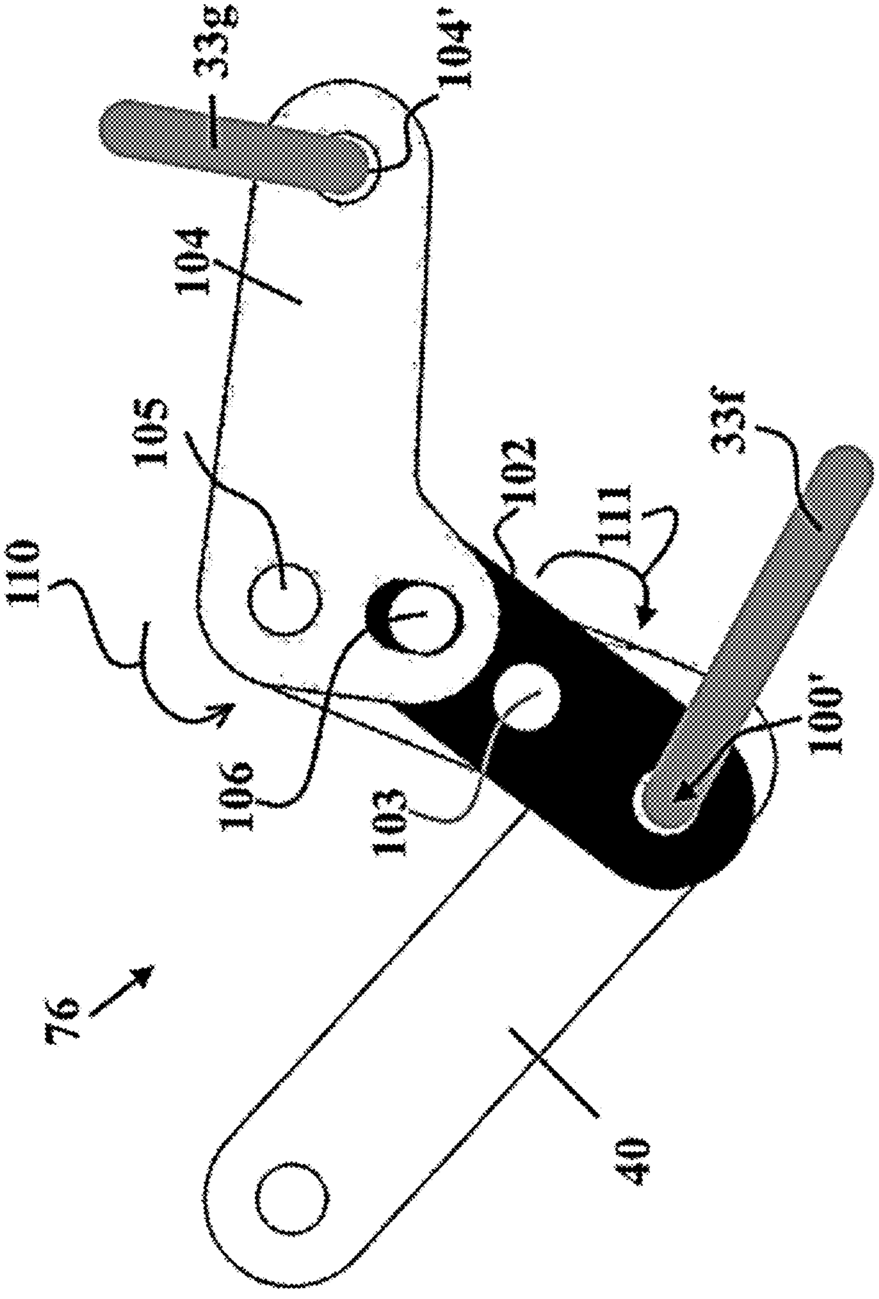
Figure 25:
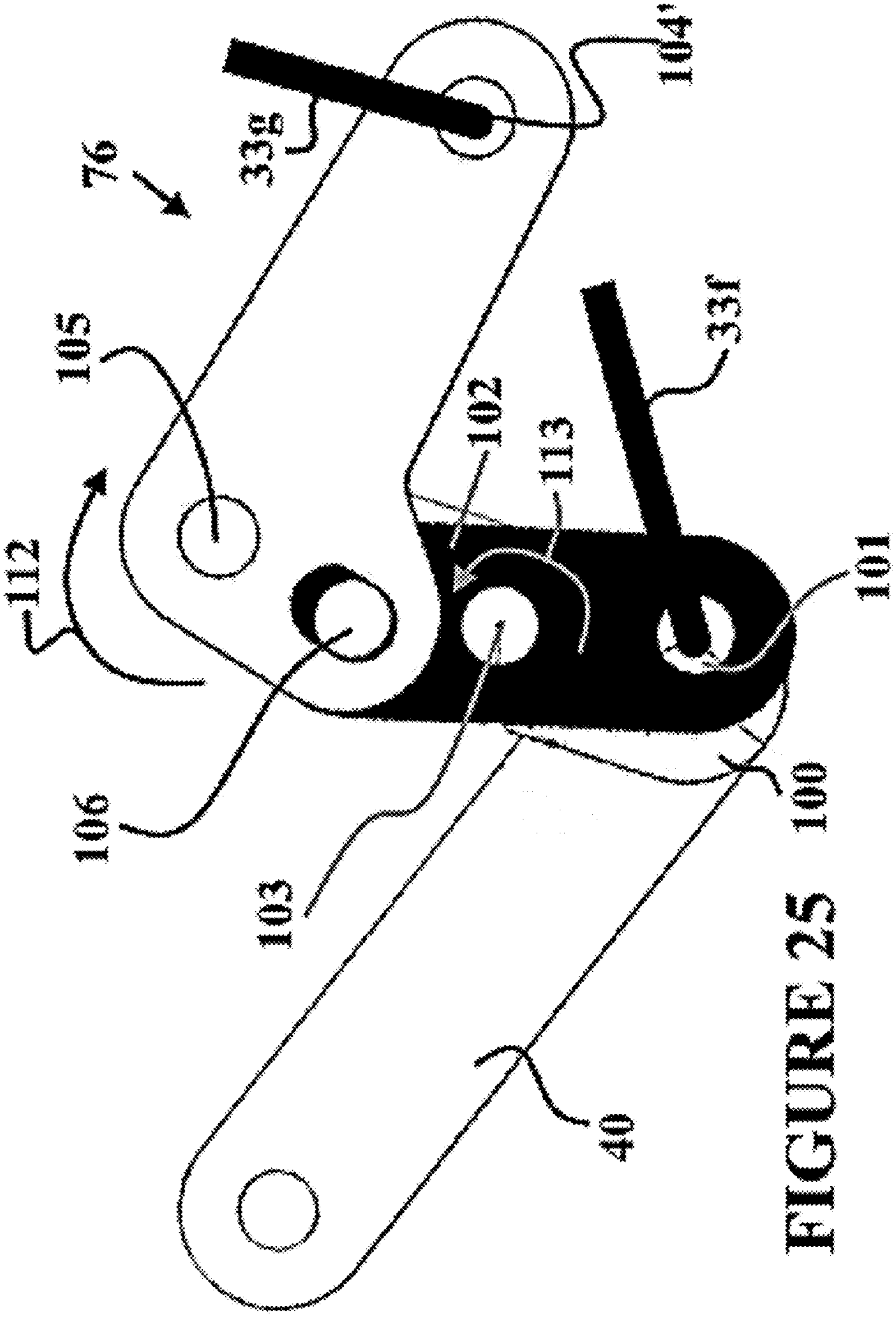
Figure 27:
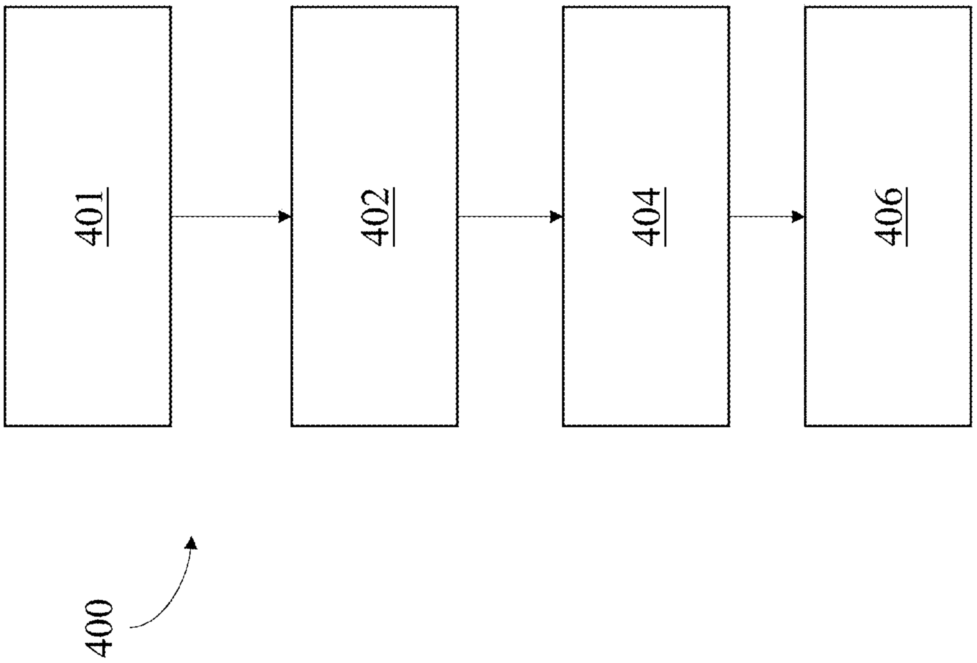
Figure 26:
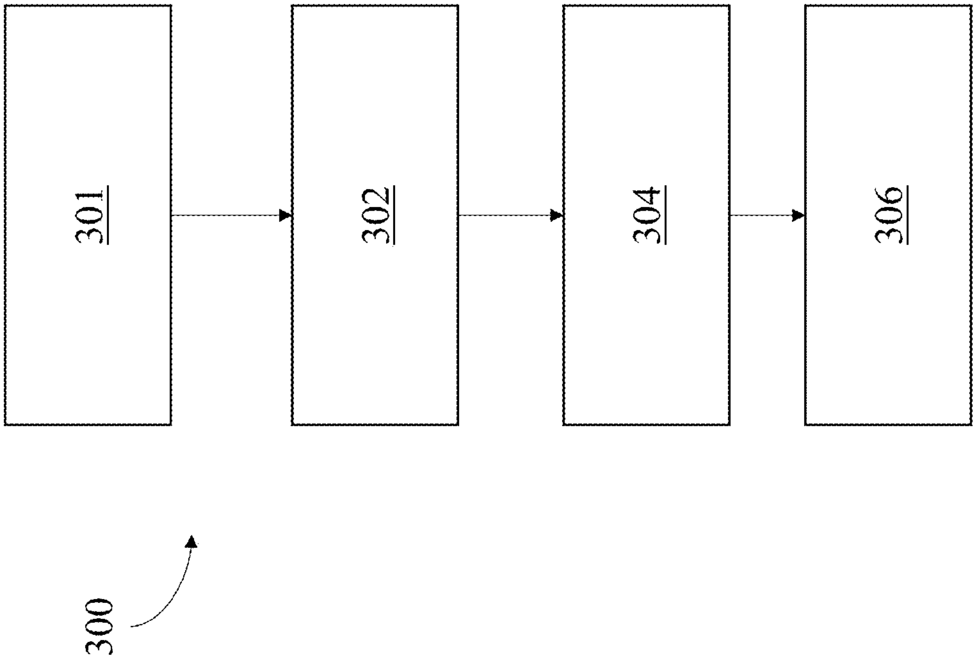
Figure 28:
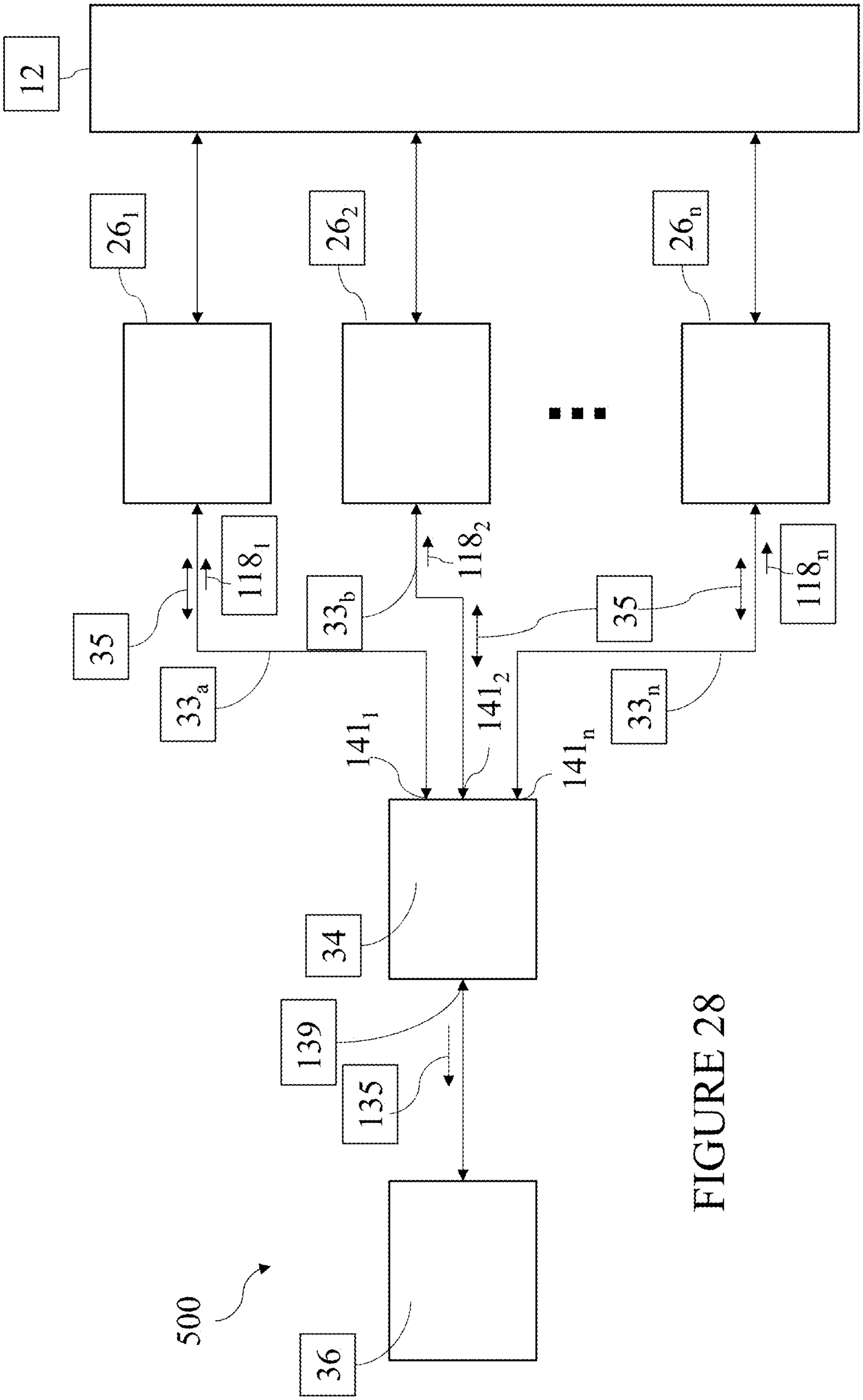

FIG. 8*a* shows operation of the cinch mechanisms of the latches of FIG. 1 corresponding to FIG. 8;

FIG. 9 is an intermediate position of the load balancing mechanism of FIG. 7;

FIG. 9*a* shows operation of the cinch mechanisms of the latches of FIG. 1 corresponding to FIG. 9;

FIG. 10 is an end position of the load balancing mechanism of FIG. 7;

FIG. 10*a* shows operation of the cinch mechanisms of the latches of FIG. 1 corresponding to FIG. 10;

FIG. 11 is a further embodiment of the load balancing mechanism of FIG. 4;

FIG. 12 is a start position of the load balancing mechanism of FIG. 7;

FIG. 12*a* shows operation of the cinch mechanisms of the latches of FIG. 1 corresponding to FIG. 12;

FIG. 13 is an intermediate position of the load balancing mechanism of FIG. 7;

FIG. 13*a* shows operation of the cinch mechanisms of the latches of FIG. 1 corresponding to FIG. 13;

FIG. 14 is an end position of the load balancing mechanism of FIG. 7;

FIG. 14*a* shows operation of the cinch mechanisms of the latches of FIG. 1 corresponding to FIG. 14;

FIG. 15 is a still further embodiment of the load balancing mechanism of FIG. 4;

FIG. 16 is a further embodiment of the latches and load balancing system of FIG. 1;

FIG. 17 shows a detailed view of the load balancing system of FIG. 16;

FIG. 18 shows a coupling between the actuator and a power cinch system of FIG. 16;

FIGS. 19*a* and 19*b* show operation of the power cinch system of FIG. 16;

FIGS. 20*a* and 20*b* show operation of a power release system of the FIG. 16;

FIGS. 21 and 22 show an example configuration and operation of the power cinch system of FIG. 16 involving a system of levers;

FIGS. 23, 24, 25 show further operational examples of the system of levers of FIG. 21;

FIG. 26 is an example operation of the load balancing system 34 of FIGS. 2*a*,2*b*; and FIG. 27 is a further example operation of load balancing system 34 of FIGS. 19*a*, 19*b*, 20*a*, 20*b*; and FIG. 28 is a block diagram of a system for controlling movement of a closure member in accordance with an illustrative embodiment.

Corresponding reference numerals are used to indicate corresponding components throughout the several views of the drawings.

DETAILED DESCRIPTION

Example embodiments are described more fully with reference to the accompanying drawings. To this end, the example embodiments are provided so that this disclosure will be thorough, and will fully convey its intended scope to those who are skilled in the art. Accordingly, numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the present disclosure. In some example embodiments, well-known processes, well-known device structures, and well-known technologies are not described in detail.

In the following detailed description, the expression “latch assembly” will be used to generally, as an illustrative example, indicate any power-operated latch device adapted for use with a vehicle closure panel to provide at least one of a power release and/or cinching feature. Additionally, the expression “door” will be used to indicate any element moveable between an open position and at least one closed position, respectively opening and closing an access to an inner compartment of a motor vehicle and therefore includes, without limitations, deck lids, tailgates, lift gates, bonnet lids, trunks, Frunks (also referred to as a Front Trunk), and sunroofs in addition to the sliding or pivoting side passenger doors of a motor vehicle to which the following description will make explicit reference, purely by way of example.

Problem to be Solved

Vehicle closure systems, particularly related to vehicle doors of the passenger-entry type, are evolving toward fully automated door opening and door closing solutions requiring less interaction with the user to open and close the vehicle door. One such system involves cinching the door. For example, one type of cinching latch is described in commonly owned US Patent Application No. US20170089105, entitled “Automotive latch with pulley for flexible cable routing”, the entire contents of which are incorporated herein by reference. This cinching function involves fully latching latch assembly(ies) associated with the door and subsequently moving the door from a partially closed position to a fully-closed position. Power assisted door latch assemblies are developed to overcome the problems associated with latching doors with lightweight construction and hard door seals, such that the door seals can have variability. Power assisted door latch assemblies can allow for low internal energy or soft closure of the lightweight doors without the need to slam the door even with the increased seal pressure that results from relatively hard door seals.

A power lock/release mechanism associated with the latch assembly can be actuated to latch/unlatch the latch assembly upon an appropriate lock/unlock command being received by a latch controller in response to activation of a door handle and/or position sensors associated with the latch position of latch components and/or closure position of the door with respect to a body of the vehicle. For closure systems associated with doors configured without an outside door handle (i.e. a handleless door), for example those equipped with a touch or touchless type of keypad, or fob-based authentication system, which can replace the “manual pull” handle unlatch function with an electronic touch or swipe function.

Solution to the Problem

Further described below, using only one remote actuator 36 (i.e. a shared actuator 36—e.g. an electric motor) can be used to share the pulling force (via respective links 33) between two different latches 26, 28—see FIGS. 2*a*, 2*b*. The remote actuator 36 can have an integrated device or “splitted” device (i.e. a load balancing mechanism 34) to facilitate coupling of the actuator 36 to more than one latch 26, 28, or generally to a cable driven actuatable closure device such as a standalone cinch device for moving the door from a partially opened position to a closed presented position, or a standalone door presenter or ice breaking device for moving the door from a closed position to a partially open presented position, as but non-limiting examples. Such standalone devices may also be combined with door latches supported in a common housing, for example as shown and described in commonly owned U.S. patent application Ser.

No. 16/362,736, entitled "Automotive Door Latch with Power Opening Feature", the entire contents of which are incorporated herein by reference. The load balancing mechanism 34 can be actuated (e.g. pulled) by the actuator 36 with a defined force and travel tailored to each of the latches 26, 28, as further described below. The load balancing mechanism 34 may be separate from the remote actuator 36, for example provided as separately handleable units (see FIG. 4B for example), of local to the load balancing mechanism 34 (see FIG. 17 for example).

Figure 3:
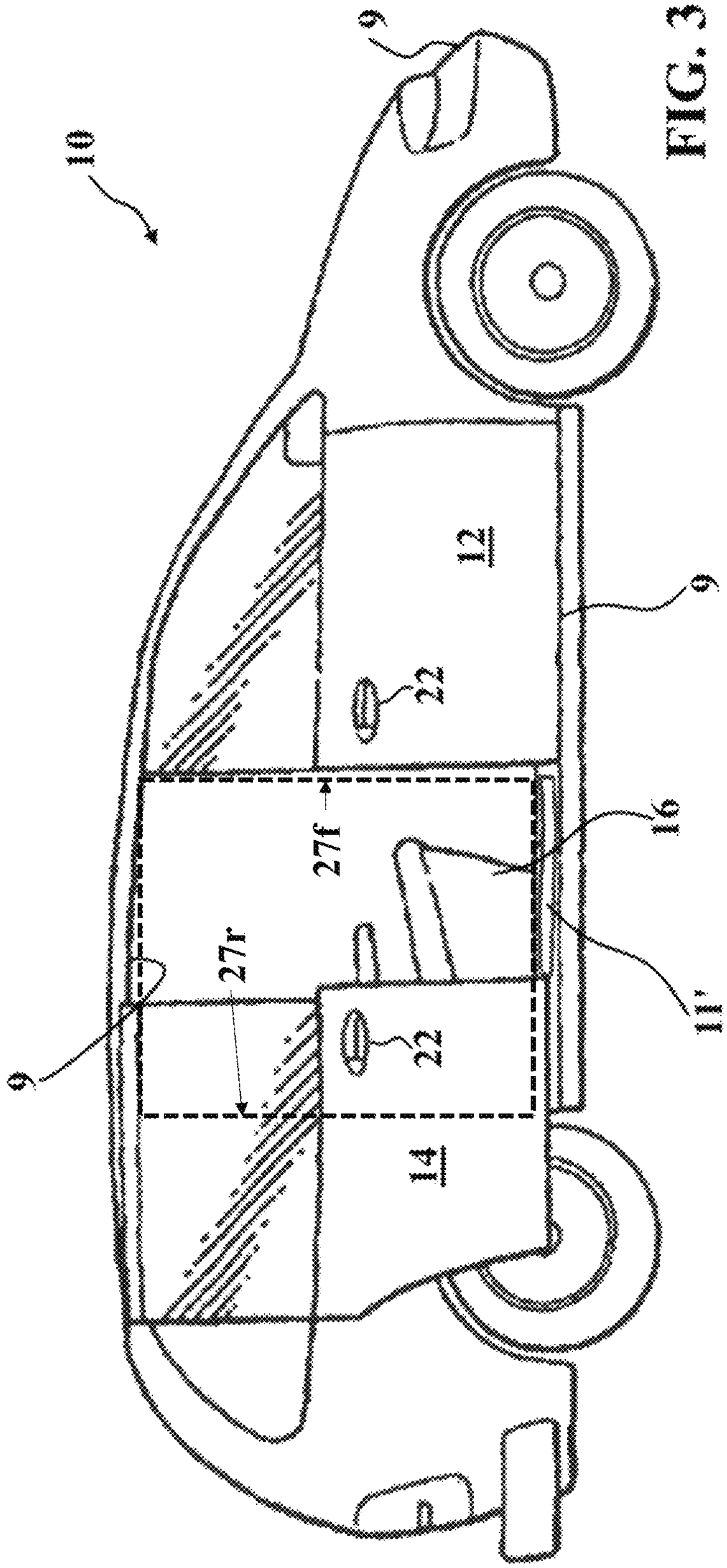

Referring to FIG. 1, a vehicle 10 includes at least one closure member, shown illustratively as two primary doors 12 (one shown) and one or more secondary (e.g. rear or third) door(s) 14 for providing access to a passenger compartment 16. In the embodiment shown, the vehicle 10 is a pick-up truck, such that the secondary door 14 is hinged to a vehicle body 9. Referring to FIG. 3, shown is the vehicle 10 as a utility vehicle, e.g. a minivan, having a sliding version of the secondary door 14 mounted on the body 9 via a sliding track 11'. The teachings herein may be applied to other types of closure members and may not be limited to those described herein, such as a pivotal closure member bounded by the A-pillar and B-pillar on opposite sides of closure member as shown in US20170089105 for example. Referring again to FIG. 1, the front door 12 is mounted (e.g. hinges 11) along an A-pillar 17 and the rear door 14 is mounted (e.g. hinges 11) along a C-pillar 18, thereby obviating the need for a B-pillar between the A-pillar 17 and the C-pillar 18. The primary 12 and the secondary 14 doors can open in opposite or alternate directions (e.g. hinged vs. sliding in terms of FIG. 3) to allow individuals to comfortably enter and exit a rear portion of the passenger compartment 16. In addition, easy loading and unloading of items into and out of the rear portion of the passenger compartment 16 can be provided when the primary 12 and secondary 14 doors are both open.

A handle assembly, generally indicated at 22, is fixedly secured to the secondary door 14 and is disposed adjacent a forward vertical edge 24 thereof. The handle assembly 22 is operatively coupled to upper 26 and lower 28 door latches, hereafter referred to as first latch 26 and second latch 28 of multiple latches 25 (e.g. two or more latches), by links 30,31 (e.g. Bowden cables), hereafter referred to generically as links 33. Further, the latches 26, 28 can be referred to as a pair of latches 25. The handle 22 can be used to operate the multiple latches 25 via concurrent operation of the multiple links 33 via a load balancing mechanism 34 positioned between the links 33 and an actuator 36 (see FIGS. 2*a* and 2*b*). For example, handle 22 having a microswitch provided thereon to detect an activation of the handle can be electrically coupled (shown as dotted line in FIGS. 2*a,b*) directly to, or indirectly via a controller (e.g. a latch controller), to the actuator 36 to control the operation of the actuator 36 for a power release operation in the configuration load balancing mechanism 34 is required to actuate release levers moving the pawl 25' (see FIG. 5) from a ratchet holding position to a ratchet release position.

Upon actuation of the handle assembly 22 when the primary door 12 is open, the first latch 26 and the second latch 28 are unlatched to open the secondary door 14. The latches 26, 28 of secondary door 14 are releasably engageable with corresponding strikers 26', 28' mounted on the body 9 of the vehicle 10 to releasably hold the secondary door 14 in the closed position. The term body 9 is used herein to refer to a structure of the vehicle such as the chassis of the vehicle 10, and may include the body 9 or structure of a closure member as will be described in details herein below. As further discussed below, the latches 26, 28, examples of an actuatable closure device, can include a cinching feature as described by example with reference to a generic latch 25 configuration shown in FIGS. 5 and 6. As shown in FIGS. 2*a* and 2*b*, the secondary door 14 can have multiple latches 25 (i.e. more than one), e.g. latches 26,28, 29, such that any multiple of the latches 25 can be coupled via a respective link 33 to the load balancing mechanism 34. It is recognized that the actuator 36 (e.g. electric motor) can be operated to implement the cinching function via operation of the door handle 22, via operation of a key fob, via operation of one or more controls (e.g. buttons) located in the interior of the vehicle 10, and/or via one or more position sensors for sensing when the secondary door 14 is positioned in the cinching position (e.g. based on a position sensor 23, such as a hall effect sensor or mechanical switch, sensing the ratchet 24' has reached a secondary ratchet position).

Referring to FIGS. 2*a* and 2*b*, the load balancing mechanism 34 is used to couple the operation of the actuator 36 shared between multiple cable driven actuatable closure devices (e.g. between a pair latches 25) to concurrent operation of the latches 25 by way of respective links 33 coupled between the load balancing mechanism 34 and the latches 25 and between the actuator 36 and the load balancing mechanism 34. For example, the actuator 36 via the load balancing mechanism 34 can be used to actuate each of the latches 25 at the same time. Alternatively, the actuator 36 via load balancing mechanism 34 can be used to begin actuation first for one of the latches 25 and then to begin actuation second for another of the latches 25 (e.g. while the first latch 26 is still in operation or after operation of the first latch 26 has ended, as desired).

Figure 4A:
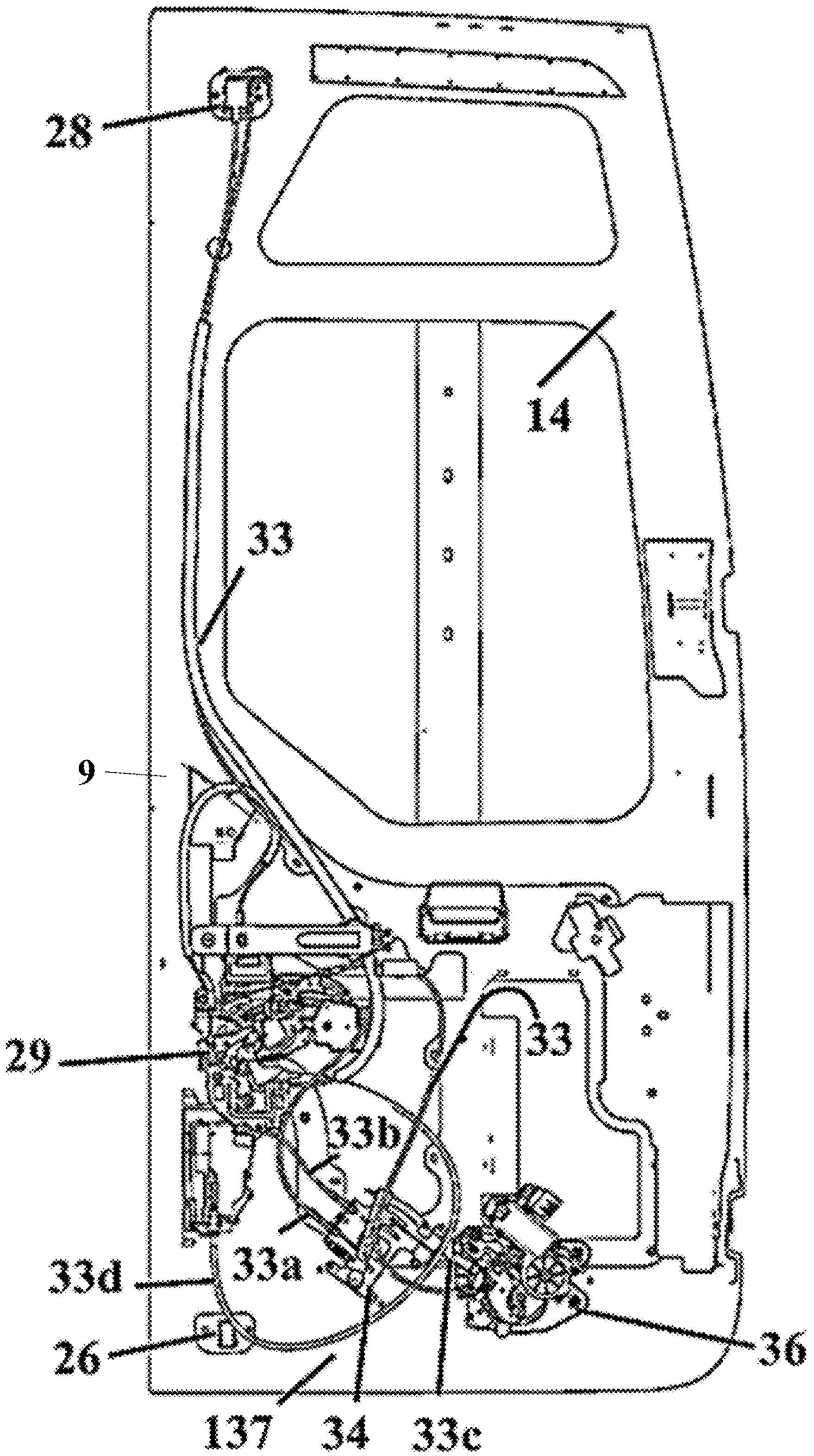

Referring to FIG. 4A, shown is an alternative embodiment of the load balancing mechanism 34, such that the load balancing mechanism 34 controls operation of latch 28 (e.g. a secondary latch for the secondary door 14) via actuator 36. In this example, the actuator 36 is mounted on one of the inner panels 137 of secondary door 14, such that the main latch 29 is coupled to the load balancing mechanism 34 via link 33*b*, the load balancing mechanism 34 is coupled to the secondary latch 28 via link 33*a* and the load balancing mechanism 34 is coupled to the actuator 36 via link 33*c*. Further, the main latch 29 can be coupled to the other secondary latch 26 by link 33*d*. In this embodiment, the main latch 29 is for latching a front of secondary door 14 of FIG. 1, with the secondary latches 26, 28 employed as cinching latches 26, 28 at either end of the sliding door 14. In this manner, it is advantageous to have the pair of secondary latches 26, 28 at either end of the sliding door 14 in order to facilitate making a proper seal (using the cinching operation of the secondary latches 26, 28) between the secondary door 14 and the body 9, as the secondary door 14 is locked via the primary latch 29. In some configurations, seal loads due toupper seals 27*t* on the vehicle body 9 acting on the top of of the secondary door 14, for example acting to resist the secondary latch 28 towards a primary latched position required to be overcome by a cinch mechanism provided in secondary latch 28 is greater than the seal loads due to bottom seals 27*b* provided at lower location(s) on the vehicle body 9 than seals 27*t* and shown at opposite locations, acting at the rear of the sliding door 14, for example acting to resist the secondary latch 28 towards a primary latched position required to be overcome by a cinch mechanism operating to cinch as indicated by arrow 51 in FIG. 6 provided in secondary latch 28. It is recognized that while cinching mechanism have been illustrated herein for example in FIGS. 5, 6 as being integrated within secondary latches 26,28, cinching mechanisms driven by the load balancing mechanism 34 may be independent from latches 26, 28. Further, the link 33*d* can be used by the main latch 29 to coordinate operation of the secondary latch 26. Alternatively, the link 33*d* can also be connected directly to the load balancing mechanism 34 and as such used to coordinate operation of both of the secondary latches 26,28, as desired.

Figure 4B:
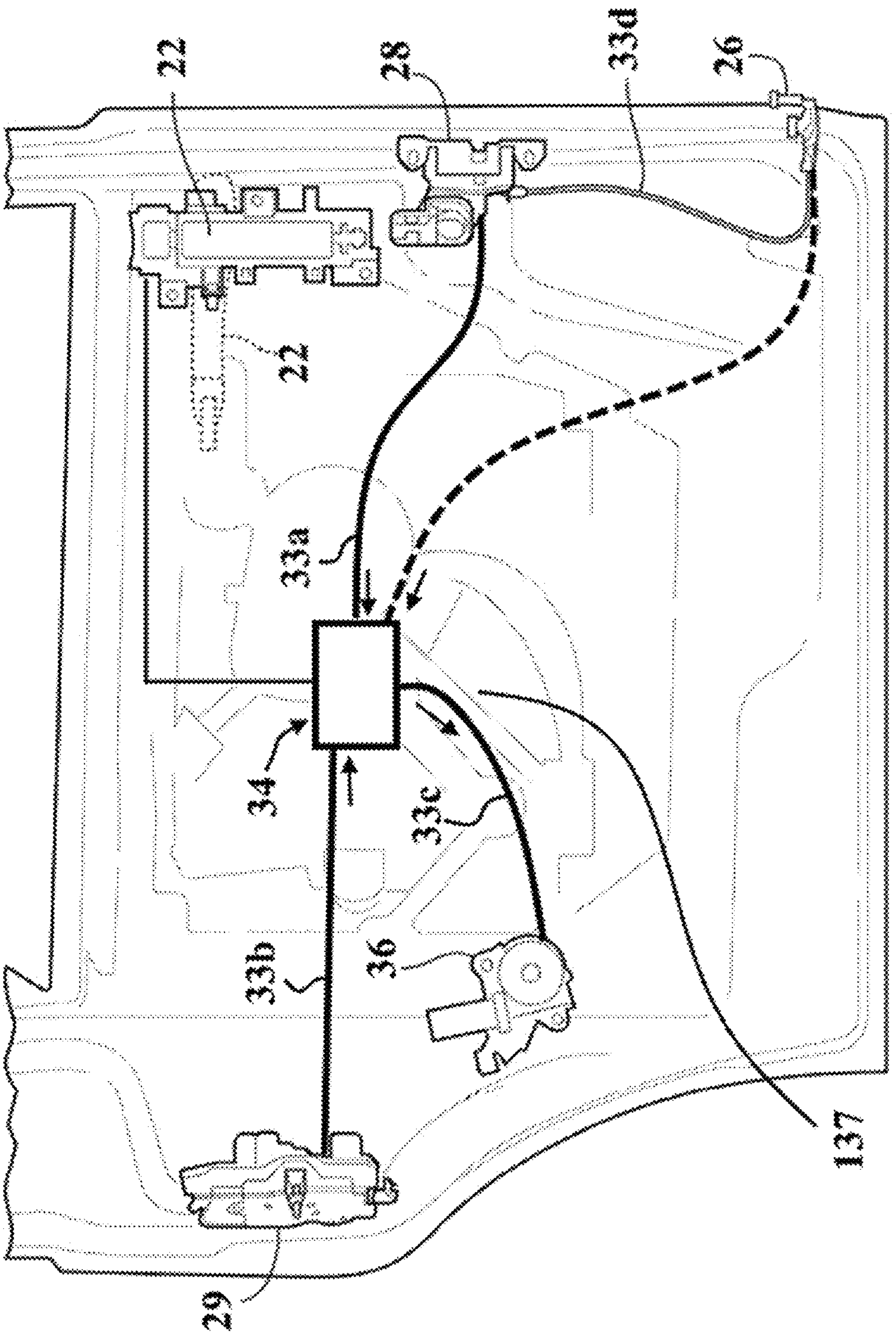

Referring to FIG. 4B, shown is an alternative embodiment of the load balancing mechanism 34, such that the load balancing mechanism 34 controls operation of latch 28 (e.g. a secondary latch for the secondary door 14 which is a sliding door) via actuator 36. In this example, the actuator 36 is mounted on one of the inner panels 137 of secondary door 14, such that the main latch 29 is coupled to the load balancing mechanism 34 via link 33*b*, the load balancing mechanism 34 is coupled to the secondary latch 28 via link 33*a* and the load balancing mechanism 34 is coupled to the actuator 36 via link 33*c*. Further, the load balancing mechanism 34 can be coupled to the other secondary latch 26, or hold open catch, by link 33*d*. In this embodiment, the main latch 29, which may be a cinching latch, is for latching a rear of sliding door 14 with the secondary latches 26, 28 employed as cinching latches 26, 28 at front end of the sliding door 14. In this manner, it is advantageous to have the pair of secondary latches 26, 28 at one end of the sliding door 14 in order to facilitate making a proper seal with front seals 27*f* (using the cinching operation of at least one of the secondary latches 26, 28) between the sliding door 14 and the body 9, as the sliding door 14 is locked via the primary latch 29 which may facilitate making a proper seal with rear seals 27*r* (using the cinching operation the primary latch 29) between the rear of the sliding door 14 and the body 9. In some configurations, seal loads due to seals 27*f* on the vehicle body 9 acting on the front of the sliding door 14, for example acting to resist the secondary latch 28 towards a primary latched position required to be overcome by a cinch mechanism provided in secondary latch 28 is greater than the seal loads due to seals 27*r* provided at different location(s) on the vehicle body 9 than seals 27*f* and shown at opposite locations, acting at the rear of the sliding door 14, for example acting to resist the primary latch 29 towards a primary latched position required to be overcome by a cinch mechanism operating to cinch as indicated by arrow 51 in FIG. 6 provided in primary latch 29. It is recognized that while cinching mechanism have been illustrated herein for example in FIGS. 5, 6 as being integrated within latches 26,28, 29 cinching mechanisms driven by the load balancing mechanism 34 may be independent from latches 26, 28, 29. Further, the link 33*d* can be used by the secondary latch 28 to coordinate operation of the secondary latch 26, e.g. simultaneous operation. Alternatively, the link 33*d* can also be connected directly to the load balancing mechanism 34 via a separate link as shown in phantom line in FIG. 4B, and as such used to coordinate operation of both of the secondary latches 26,28, as desired.

Referring to FIG. 7, shown is the load balancing mechanism 34 coupled to the actuator 36 and latches 26,28 (see FIG. 2*a*,2*b*) via links 33*a*,*b*, the load balancing mechanism 34 mounted on the body 119 (e.g. formed by inner panels 137 of the secondary door 14). The load balancing mechanism 34 can have a lever 40 mounted at pivot F (fulcrum) to a housing 41. A balancer element (e.g. pulley) 42 can be used to equalize the tension in the links 33*a*,*b* coupled to the latches 26, 28, for example as a result of the pulley 42 being allowed to operate e.g. move such as by rotation or pivoting in response to the tension in the links 33*a*, *b* or resistance from each link 33*a*, *b* acting on the pulley 42 being different. In other words the balancer element 42 may act, for example by movement such as pivoting, to distribute the actuation force 135 received from the actuator 36 and acting on the balancer element 42 differently between each of the links 33 and/or allow the tension or loading in the links 33 to balance between each other. The pulley 42 can be used to couple the lever 40 to the pair of links 33*a*,*b* connected to the latches 26, 28, the pulley 42 mounted to the lever 40 at axis L (load) such that the pulley 42 is free to rotate about the axis L as an example of an input configuration 237 operably coupling the load balancer element 42 to the actuator 36 to receive an actuation force 135 (e.g. the pulling force imparted by link 33*c* for example) from the actuator 36. Other types of input configurations are possible, for example link 33*c* may be directly coupled to the load balancer element 42 e.g. to axis L of pulley 42 as an example. The actuator 36 is coupled via the link 33*c* to the lever 40 at mounted point E (effort), such that actuation force 135 (arrow A), such as a pulling force, of the link 33*c* by the actuator 36 causes the lever 40 to pivot about the pivot F and move relative to the housing 41, thus actuating such as by pulling (arrows B, C) for example on the links 33*a*,*b* each connected to the pulley 42 at the pulley outputs $\mathbf{141}_1$, $\mathbf{141}_2$, and each connected to an associated one of the latches 26, 28 in order to actuate the latch components 37 (e.g. cinching mechanism 1, 2—see FIGS. 5, 6) of the latches 26, 28. The lever 40 can also be coupled to track 44 (e.g. of arcuate shape) in order to guide the movement of the lever 40 about the pivot F. Lever 40 pivoting about the pivot F causes the load balancer element 42 to operate and move relative to the housing 41, and for example to translate linearly, or nearly linearly such as along an arc of travel.

As such, the load balancing mechanism 34 controls concurrent operation of the pair of latches 26,28 of the vehicle 10 via the respective pair of links 33*a*,*b* connecting the pair of latches 26,28 to the actuator 36, the actuator 36 for sharing by the pair of latches 26,28. As shown, by example: the housing 41 is for connecting to the body 9 of the closure member 12, such as for example the secondary door 14; the lever 40 is mounted to the housing 41 at the fulcrum (e.g. pivot) F such that the lever 40 is pivotable about the fulcrum F; the actuator 36 is connected to the mounting point E on the lever 40 connecting the lever 40 to the actuator 36, the actuator 36 is for rotating the lever 40 about the fulcrum F; and the balancer element 42 (e.g. pulley 42) is mounted on the lever 40 at the axis L and rotatable about the axis L, such that each of the respective pair of links 33*a*,*b* is positioned on opposite sides of the axis L, each of the respective pair of links 33*a*,*b* for coupling to a corresponding one of the pair of latches 26, 28. During operation, the actuator 36 causes both movement such as a rotation of lever 40 about the fulcrum F and corresponding movement of the balancer element 42 to cause the pulling (arrows B, C) on the links 33*a*,*b* while the pair of latches 26,28 are operated concurrently. Furthermore depending on a differential in resistance to actuation, such as the counter resistance 118 to the pulling force (arrows B, C) of the links 33*a*,*b* by the actuated closure device, such as a resistance caused by the cinching mechanism of latch 26, 28, rotation of the balancer element 42 (e.g. pulley 42) about the axis L while the pair of latches 26,28 are operated concurrently may occur. Counter resistance 118 to the pulling force (arrows B, C) of the links 33*a*,*b* is shown as an example in FIG. 8*a* whereby latch 28 generates a resistance less than latch 26 illustrated by a difference in the length of the arrows 118. In other words, an operation, such as a rotation, of the load balancer element 42 about the axis L varies in response to a loading differential imparted on the load balancer element 42 by the pair of links 33*a*, 33*b*, which may be caused by a difference in resistance 118 in each operation of the pair of latches 26, 28, while the pair of latches 26, 28 are operated concurrently. Referring to FIGS. 8 and 8*a*, shown is the load balancing mechanism 34 at a start position (e.g. neither of the latches 26, 28 are cinched), noting that cinched position of the latches 26, 28 is shown by example at position C in FIGS. 8*a*, 9*a*, 10*a*. In this example, cinch mechanism 2 has a lower load than cinch mechanism 1 (e.g. due to different seal loads at different cinch positions on the secondary door 14). In FIGS. 9 and 9*a* as the lever 40 rotates about the pivot F, shown is an intermediate position of the latches 26, 28, whereby actuation of the link 33 has caused actuation of the links 33*a*, 33*b*, such that the cinch mechanism 2 of the latch 28 is in the cinch position C while the cinch mechanism 1 of the latch 26 is still in the uncinched position (e.g. away from position C). Approaching this position in FIGS. 9, 9*a*, operation (e.g. pulling) of link 33 will result in rotation 42' of the pulley 42 (as the lever 40 further pivots about the pivot F) due to the fact that the lever 40 will have more travel for the cinch mechanism 2 that has the lower load position (i.e. as compared to cinch mechanism 1). Once the cinch mechanism 2 of the latch 28 is in the cinch position C, further operation (e.g. pulling) of link 33 will result in further rotation 42" (e.g. opposite in direction to that of rotation 42') of the pulley 42 (as the lever 40 further pivots about the pivot F) until the cinch mechanism 1 is also in the cinch position. As shown in FIGS. 10, 10*a*, both of the cinch mechanism 1, 2 have reached their respective cinch positions C due to operation of the load balancing mechanism 34. As shown in FIGS. 8*a*, 9*a*, 10*a*, the different distances D of the cinch mechanisms 1,2 from the cinch position C signifies the different travel lengths 59 the links 33*a,b* undergo as the cinch mechanisms 1,2 are operated using the shared actuator via the load balancing mechanism 34 (see FIG. 7). For example due to resistance 118 acting on link 33*a* as a result of latch 28 being greater than the resistance 118 acting on link 33*b* as a result of latch 26 as shown in FIG. 8A, the travel 59 of link 33*a* may be less than the travel of 59 of link 33*b* during concurrent operation of the latches 26, 28 as represented by the differential in magnitudes of arrows 59.

Referring to FIG. 11, shown is a further embodiment of the load balancing mechanism 34 coupled to the actuator 36 and latches 26,28 (see FIG. 2*a*,2*b*) via links 33*a,b*, the load balancing mechanism 34 mounted on the body 9 (e.g. of the secondary door 14). Optionally, the load balancing mechanism 34 can have a balancer element (e.g. arm) 45 mounted at pivot F (fulcrum) to the housing 41. The lever 40 can be used to account for different travel distances D of the links 33*a,b* coupled to the latches 26, 28. The arm 45 can be used to couple the lever 40 to the pair of links 33*a,b* connected to the latches 26, 28, the arm 45 mounted to the lever 40 at axis L (load) such that the arm 45 can be free to rotate about the axis L. The actuator 36 is coupled via the link 33*c* to the lever 40 at mounted point E (effort), such that actuation of the link 33*c* by the actuator 36 causes the lever 40 to pivot about the pivot F, thus pulling on the links 33*a,b* connected to the latches 26, 28 in order to actuate the latch components 37 (e.g. cinching mechanism 1, 2—see FIGS. 5, 6) of the latches 26, 28. The lever 40 can also be coupled to track 44 (e.g. of arcuate shape) in order to guide the movement of the lever 40 about the pivot F.

As such, the load balancing mechanism 34 controls concurrent operation of the pair of latches 26,28 of the vehicle 10 via the respective pair of links 33*a,b* connecting the pair of latches 26,28 to the actuator 36, the actuator 36 for sharing by the pair of latches 26,28. As shown, by example: the housing 41 is for connecting to the body 9 of the secondary door 14; the lever 40 is mounted to the housing 41 at the fulcrum (e.g. pivot) F such that the lever 40 is pivotable about the fulcrum F; the actuator 36 is connected to the mounting point E on the lever 40 connecting the lever 40 to the actuator 36, the actuator 36 for rotating the lever 40 about the fulcrum F; and the balancer element 45 is mounted on the lever 40 at the axis L and rotatable about the axis L, such that each of the respective pair of links 33*a,b* is positioned on opposite sides of the axis L which is an example of at least two outputs 141$_1$, 141$_2$ of the load balancer element 42 each operably coupled to one of the at least pair of links 33*a*, 33*b*, each of the respective pair of links 33*a,b* for coupling to a corresponding one of the pair of latches 26, 28. During operation, the actuator 36 causes both movement such as rotation of lever 40 about the fulcrum F and corresponding movement of the balancer element 42 so as to actuate, such as pull, links 33*a, b* which may cause rotation R of the balancer element 42 about the axis L, for example due to differences in resistance or opposition to pulling by the balancer element 42 between the links 33*a, b*, while the pair of latches 26,28 are operated concurrently.

Referring to FIGS. 12 and 12*a*, shown is the load balancing mechanism 34 at a start position (e.g. neither of the latches 26, 28 are cinched), noting that cinched position of the latches 26, 28 is shown by example at position C in FIGS. 12*a*, 13*a*, 14*a*. In this example, cinch mechanism 2 has a lower load than cinch mechanism 1 (e.g. due to different seal loads at different cinch positions on the secondary door 14). In FIGS. 13 and 13*a* as the lever 40 rotates about the pivot F, shown is an intermediate position of the latches 26, 28, whereby actuation of the link 33*c* has caused actuation of the links 33*a*, 33*b*, such that the cinch mechanism 2 of the latch 28 is in the cinch position C while the cinch mechanism 1 of the latch 26 is still in the uncinched position (e.g. away from position C). Approaching this position in FIGS. 13, 13*a*, operation (e.g. pulling) of link 33*c* will result in rotation 45' of the balancer element 45 (as the lever 40 further pivots about the pivot F) due to the fact that the lever 40 will have more travel for the cinch mechanism 2 that has the lower load position (i.e. as compared to cinch mechanism 1). Once the cinch mechanism 2 of the latch 28 is in the cinch position C, further operation (e.g. pulling) of link 33*c* will result in further rotation 45" (e.g. opposite in direction to that of rotation 45') of the balancer element 45 (as the lever 40 further pivots about the pivot F) until the cinch mechanism 1 is also in the cinch position. As shown in FIGS. 14, 14*a*, both of the cinch mechanism 1, 2 have reached their respective cinch positions C due to operation of the load balancing mechanism 34. As shown in FIGS. 12*a*, 13*a*, 14*a*, the different distances D of the cinch mechanisms 1,2 from the cinch position C signifies the different travel lengths the links 33*a,b* undergo as the cinch mechanisms 1,2 are operated using the shared actuator via the load balancing mechanism 34 (see FIG. 11).

Referring to FIGS. 1 and 15, shown is an alternative embodiment of the load balancing mechanism 34, with lever 40 absent. The housing 41 (see FIG. 7) has a pair of balancer elements (e.g. pulleys) 42 connected to the housing 41 at axis L, such that pulley #1 is connected via links 33*a,b* to the latches 26, 28. Pulley #2 is connected via link 33*c* to the actuator 36. As such, the pulley #2 of the pulleys 42 substitutes for the operation of the lever 40 of FIG. 7. FIG.

15 illustrates another example of the pulley 42 undergoing a translation in response to the actuation of the actuator 36, illustrated by arrows 77.

Figure 5:
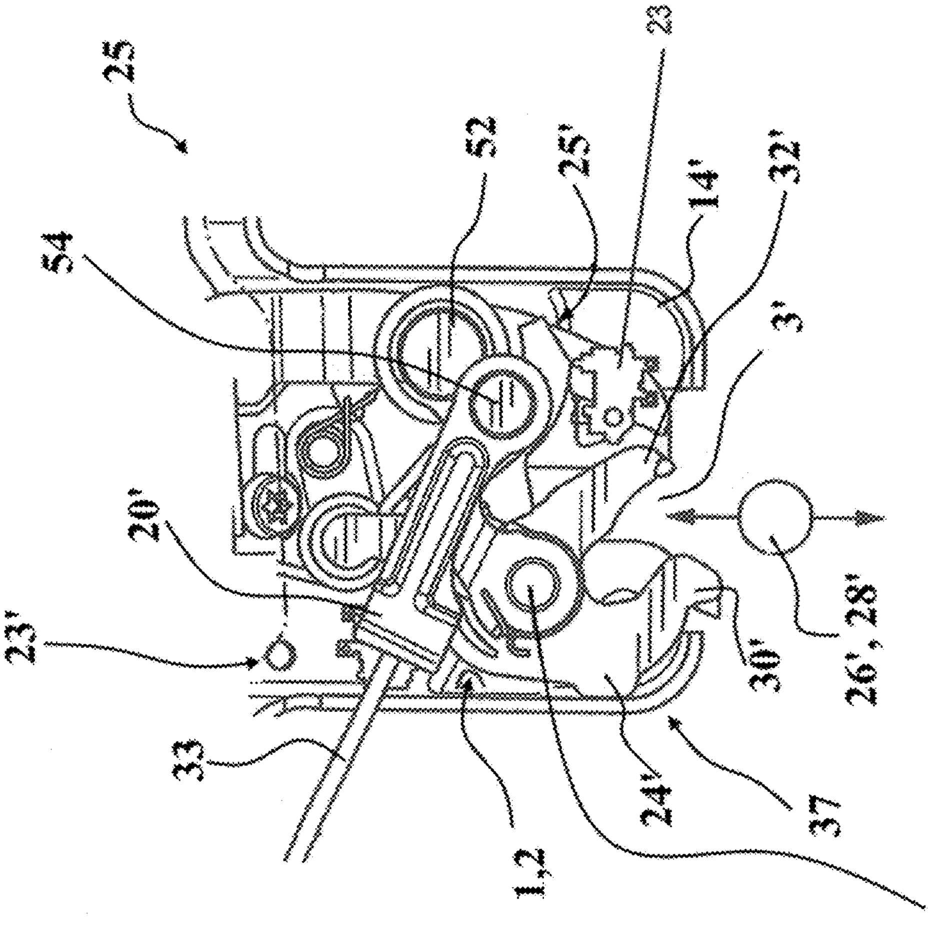
FIG. 5 is a side view of an example latch with cinch mechanism of the latches of FIG. 1.
Figure 6:
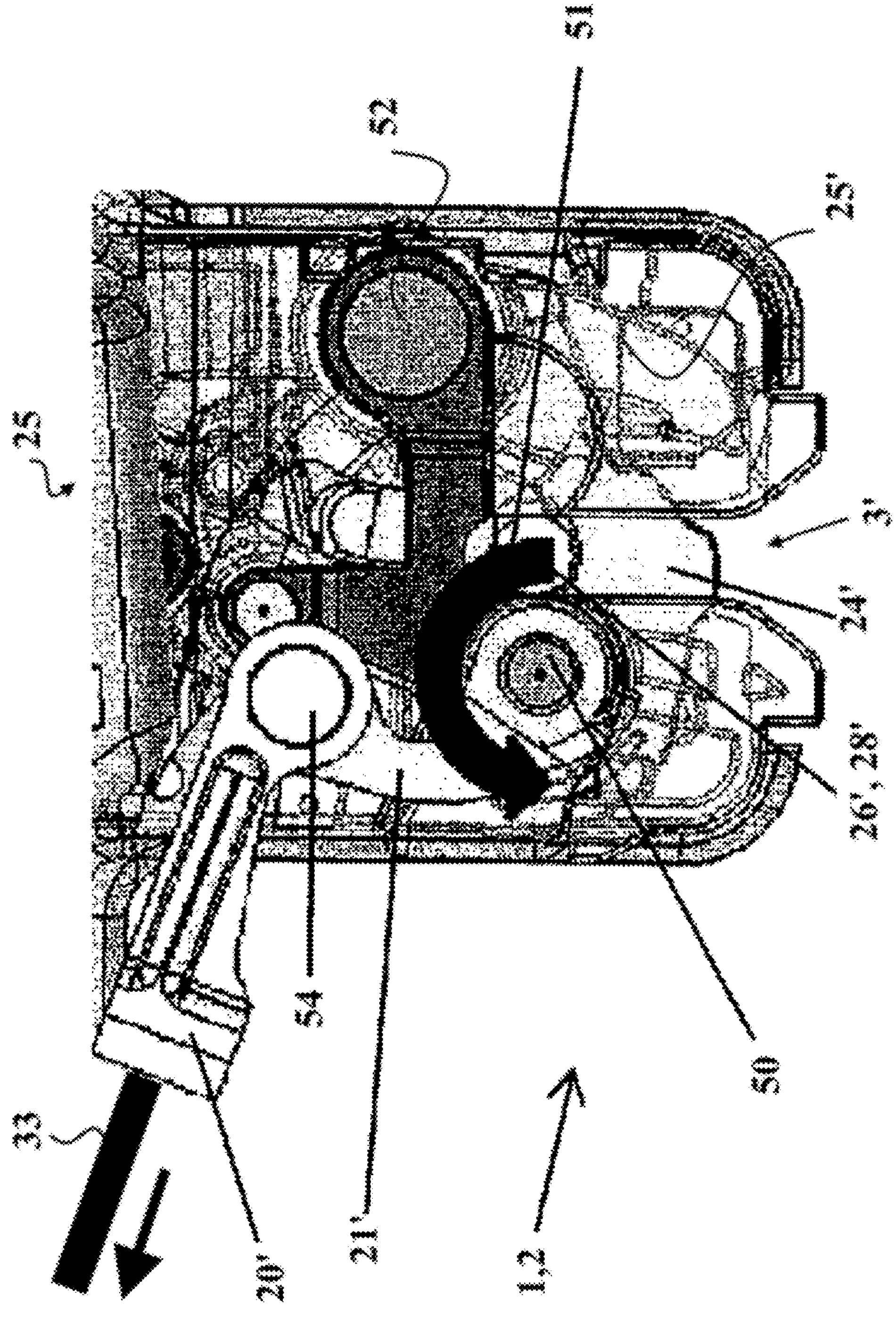
FIG. 6 is further view of the example latch of FIG. 5.

Referring to FIGS. 5 and 6, shown is an example of a latch 25 containing latch components 37 (e.g. ratchet 24', pawl 25', cinch mechanism 1, 2). In this manner, the cinch mechanism 1,2 of the latch 25 can be used to forcefully provide, during deployment, some form of force assisted open operation (e.g. full open, partial open, etc.) of the door 14 and/or some form of force assisted close operation (e.g. full open, partial open, etc.) of the door 14, during opening/closing of the door 14. The actuator 36 (see FIG. 2*a*) is coupled to a cinch arm 20' via the link 33 (e.g. coupled to the load balancing mechanism 34, see FIG. 2*a*) and also to one or more latch components 23' (e.g. ratchet 24' and/or pawl 25'). As such, the cinch arm 20' can be actuated (e.g. pulled) by the link 33*a,b* to operate the latch 25 from a partially closed position (e.g. secondary latched position) to a fully closed position (e.g. primary latched position), as the cinch arm 20' can be coupled to the ratchet 24' via a cinch lever arm 21'. It is also recognized that the link 33*a,b* can be provided as a rigid linkage rather than as a flexible linkage involving cables. For example, the link 33*a,b,c* can be embodied as a sector gear (or other series of rigid members) connected to the cinch arm 20' and/or the cinch lever 21' at one end of the link 33*a,b,c*. At the other end of the link 33*a,b,c*, the load balancing mechanism 34 is operated as discussed above in order to move the cinch arm 20' in order to cinch the latch 25 as described.

Referring again to FIGS. 5, 6, the latch 25 includes the number of latch elements 23' (e.g. ratchet 24', cinch lever 21' and pawl 25') that are configured to cooperate with the striker 26',28') in order to retain the striker 26', 28' within a slot 3' when the door 14 is in the closed position (e.g. locked), or otherwise to drive the striker 26', 28' out of the slot 3' when the door 14 is in the open position (e.g. as part of a door presenting or ice breaking function). The fish mouth or slot 3' is sized for receiving the striker 26', 28' therein, in other words the slot 3' of the latch 25 is configured for receiving a keeper (e.g. striker 26', 28'). The slot 3' has an open top end and a closed bottom end as shown. The latch elements 23' of the ratchet 24' and pawl 25' are pivotally secured to a frame plate 14' via respective shafts 50, 52. The cinch arm 20' pivots about pivot 54. The ratchet 24' includes an arm 30' and arm 32' spaced apart to define a generally u-shaped slot there between (e.g. a hook of arm 30' and a lip of arm 32' that extends laterally beyond the hook). Note that in FIG. 6 the latch 25 with associated ratchet 24' is shown in the fully or primary closed position (e.g. facilitating the retention of the striker 26', 28' within the slots 3').

Referring to FIGS. 5 and 6, the latch components 23' can include a number of biasing elements (for example springs), such as a ratchet biasing element (not shown) that biases rotation of the ratchet 24' about the shaft 50 to drive the striker 26', 28' out of the slot 3' (thus moving the door 14 towards the open position), pawl biasing element (not shown) that biases rotation of the pawl 25' about the shaft 52 to retain the ratchet 24' in the closed position (i.e. restrict rotation of the ratchet 24' about the shaft 52 under the influence of the ratchet biasing element), cinch biasing element (not shown) that can bias rotation of the cinch lever 21' towards an un-cinched position for the ratchet 24' about shaft 50 and linkage biasing element (not shown) that biases return of the link 33 towards an un-cinched position of the ratchet 24'. During operation of the cinch mechanism 1, 2, actuation of the link 33 causes the attached cinch lever 21' and attached cinch arm 20' to be moved, thereby rotating the ratchet 24' about the shaft 50 towards and into the cinched position C, thus positioning the striker 26', 28' in the fully closed position in the slot 3' of the latch 25 (see FIG. 6).

Referring to FIG. 16, shown is an alternative embodiment of the door 12 having different latches 26, 28 controlled by the shared remote actuator 36. The handle 22 can be used as a trigger to activate the remote actuator, as desired. The remote actuator 36 is mounted to a load balancing system 34 (alternative embodiment) having a housing 41 mounted to a body 119 of the door 12. The load balancing system 34 has a power release system 34*a* (e.g. secondary hook element 88 and associated release links 33*d*, 33*e*) and a power cinch system 34*b* (e.g. system of levers 76 coupled to a disengagement lever 72 by the lever 40), as shown in FIG. 17.

As shown in FIG. 17, the power release system 34*a* is coupled to each of the latches 26, 28 by respective release links 33*d* and 33*e*. Similarly, a power cinch system 34*b* is coupled to each of the latches 26, 28 by respective cinch links 33*f* and 33*g*. As such, the load balancing system 34 is coupled to each latch 26, 28 by a pair of respective links 33*d,e,f,g*, i.e. release link 33*d* and cinch link 33*f* for latch 26 and release link 33*e* and cinch link 33*g* for latch 26.

Referring to FIGS. 17, 18 and 19*a,b*, the remote actuator 36 is operatively connected (by gear 36'—see FIG. 19*b*) to a sector gear 70, which is rotatable in one direction (indicated by arrow D) by the remote actuator 36 in order to drive the power release system 34*a* and rotatable in the other direction (indicated by arrow E) in order to drive the power cinch system 34*b*. As shown by example, the sector gear 70 is coupled to the disengagement lever 72 by a hook member 74, for example by pivot connection 78 between the hook element 74 and the sector gear 70 and abutment surface 80 for contacting abutment 82 positioned on the disengagement lever 72. The hook element 74 includes a counterbalance 175 and may pivot about pivot connection 78. Further, the sector gear 70 and the disengagement member 72 are also connected to the housing by pivot 71.

Referring again to 17, 18 and 19*a,b*, by example for operation of the power cinch system 34*b*, as the sector gear 70 rotates 84 (e.g. counter clockwise), as driven by gear 36' connected to the remote actuator 36, the hook element 74 moves with the sector gear 70 by pivot connection 78 and thus also causes the disengagement lever 72 to rotate 86 (e.g. counter clockwise). As the disengagement lever 72 is connected to lever 40, lever 40 drives operation of the system of levers 76 in order to actuate each of the cinch links 33*f*, 33*g*. Disengagement lever 72 may alternatively be connected to linkage 33*c* or lever 40 of the configuration as shown in FIGS. 7 and 11 as described herein above. As the cinch links 33*f*, 33*g* are actuated, they drive an actuated closure device, such as the cinch mechanisms of the latches 26,28, for example the cinch lever 21' (see FIG. 5). It is recognized that each of the cinch links 33*f*, 33*g* are connected to respective cinch levers 21' of the respective latches 26,28.

Referring to FIGS. 20*a*, 20*b*, the operation of the power release system 34*a* is shown. The power release system 34*a* includes the secondary hook element 88 connected to the housing 41 by pivot 90. The hook 74 has an abutment 92 following a guide slot 75 formed on the secondary hook element 88 having an abutment surface 94 of the secondary hook element 88 for engaging the abutment 92, such that rotation 96, counterclockwise as shown in FIG. 20*b*, of the sector gear 70 about the pivot 71 (i.e. by the gear 36' driven by remote actuator 36—see FIGS. 17, 19*b*) drives the abutment 92 into engagement with the abutment surface 94 and thus rotates 98 the secondary hook element 88 about the pivot 90, for example secondary hook element 88 is driven clockwise in FIG. 20*b* about pivot 90. As the secondary hook elements 88 rotates about the pivot 90, the release links 33*d*, 33*e* are actuated, and for example pulled, and thus activate the latches 26,28 (e.g. by releasing the pawl 25' of each of the latches 26,26—see FIGS. 5,6) in order to release their respective strikers 26', 28'. It is recognized that each of the release links 33*d*, 33*e* are coupled to their respective latch element (e.g. their pawl 25' of their respective latch 26, 28). A third release link 33*i* may also be shown for controlling release of a third latch (not shown). It is also shown that a physical handle link 22' of the handle 22 can be connected to the secondary hook element 88, thus facilitating a manual release of the latches 26,28 through manual activation of the handle 22, as desired.

Referring to FIG. 21, shown is the lever 40 connecting the disengagement lever 72 to the system of levers 76, which are used to actuate the cinch links 33*f*, 33*g*. The system of levers 76 includes a first lever 100 connected to the lever 40 at pivot 101. The first lever 100 is also connected to the release link 33*f* connected to the latch 26 (e.g. upper latch). A second lever 102 is connected to the first lever 100 by pivot connection 103. A third lever 104 is connected to the second lever 102 by pivot connection 105.

The pivot connection 105 is also connected to the housing 41 and is thus fixed in position with respect to the housing. The system of levers 76 is shown in a non-cinched position of FIG. 21 and a cinched position of FIG. 22. The load balancing mechanism 34, and for example the system of levers 76, allows for the links 33 to exit at various angles and from various points of the housing 41 to allow an orientation of the links 33 towards the respective actuatable closure device without having to provide bends, or to minimize the bends, in the portions of the links 33 between the housing 41 and the actuatable closure device, such as latches 26, 28. For example the load balancing mechanism 34 may allow for an actuation of the link 33 in a direction generally parallel to the direction of another link 33 as shown in FIG. 7 extending towards its associated actuatable closure device. The load balancing mechanism 34 may also be configured such that the links 33 extend from the housing 41 at angles that are not parallel with each other as shown in FIG. 21. The load balancing mechanism 34 may therefore be configured such that the links 33 extend from the housing 41 at an angle relative to each other, and which may be for example non-parallel. For example such a non-parallel angle 79 relative to one another is illustrative shown in FIG. 22. Providing for such an offset in the links 33 extending away from the housing 41 allows for a shorter link 33 to be provided since angle corrections (e.g. bends) in the links 33 after exiting from the housing 41 to assume the proper orientation towards the actuatable closure device are not required or minimized, in addition to other advantages such as less space within the door 12 to accommodate such bends and course corrections of the links 33 towards the actuatable closure device. The links 33 therefore may be provided to extend within the housing 41 and away from the load balancer element 42 outputs $141_1$, $141_2$ without bending or deviation to be properly pre-angled before exiting the housing 41 to account for the different positioning of the pair of latches 26, 28 for example.

In operation, as the disengagement lever 72 is rotated 86 (see FIG. 19*a*), the lever 40 moves with the disengagement lever 72 and thus causes the first lever 100 to rotate about the pivot 105. As the first lever 100 is also connected to the cinch link 33*f*, the cinch mechanism of the latch 26 is actuated. Further, as the first lever 100 is moved, the second lever 102 pivots about the pivot 103 and thus the second lever moves about the pivot connection 103 relative to the first lever 100, which causes the pin and slot connection 106 to move (i.e. rotate) the third lever 104 about the pivot connection 105. Third lever 104 movement is therefore controlled the movement of second lever 102 via pin and slot connection 106 and provides a load balanced extension to second lever 102 to which cinch link 33*g* may be mounted at different positions/angles thereto. For example as shown in FIG. 21, third lever 104 is shown as mounted relative to second lever 102 and a perpendicular angle to one another, and therefore, cinch link 33*g* is able to be coupled to third lever 104 without having to undergo a bend to be coupled to second lever 102. As the third lever 104 is also connected to the cinch link 33*g*, the cinch mechanism of the latch 28 is actuated.

Referring to FIGS. 23, 24, 25, shown are two example operations of the system of levers 76. FIG. 23 shows a starting/rest position of the system of levers 76, namely that the first lever 100 and the second lever 102 are aligned with one another (for example) prior to rotation of the third lever 104 about the pivot connection 105 in view of the force of the pin and slot connection 106. FIG. 24 shows a resultant position of the system of levers 76 (from the rest position of FIG. 23) when the link 33*f* is the cable with the lower resistance (i.e. the corresponding latch 26 is easier to move/operate than the latch 28), which causes the second lever 102 to rotate 111 about the pivot 103 and thus cause the pin and slot connection 106 to pivot the third lever 104 in a direction 110 about the pivot connection 105 (where direction 110 is opposite to the direction 111 of the second lever 102 about the pivot connection 103). FIG. 25 shows a resultant position of the system of levers 76 (from the rest position of FIG. 23) when the link 33*f* is the cable with the higher resistance (i.e. the corresponding latch 28 is easier to move/operate than the latch 26), which causes the second lever 102 to rotate about the pivot connection 103 and thus cause the pin and slot connection 106 to pivot the third lever 104 in a direction 112 about the pivot connection 105 (where direction 112 is opposite to the direction 113 of the second lever 102 about the pivot connection 103). In the case of FIG. 24, the connection 104' of the link 33*g* with the third lever 104 moves away from the connection 100' of the link 33*f* with the first lever 100. In the case of FIG. 25, the connection 104' of the link 33*g* with the third lever 104 moves towards the connection 100' of the link 33*f* with the first lever 100.

Concurrent operation of the pair of latches 26,28 as a result of driving the respective pair of links 33*a,b* via movement of the balancer element 42 in response to movement of the lever 40 caused by actuation of the actuator 36 may cause the pair of latches 26,28 to operate, and for example cinch, at simultaneous or near simultaneous rates, for example due to similar geometries of travel of the cinch mechanism in each latch 26, 28, due to similar resistances due to seal loads and friction in the door system during the actuation, or cinching operation. However, due to differences in operation between each pair of latches 26,28, for example due to differences in seal loads (e.g. 27*r*, 27*f*) acting about a latch 26, 28 different than acting about another one of the latch 26, 28 and travel of the cinch mechanism, concurrent operation of the pair of latches 26,28, may cause concurrent operation of the pair of latches 26, 28 at different rates of travel of an actuated mechanism such as a cinch lever and corresponding different travel of the links 33 connected to the pair of latches 26, 28, for example one of the pair of latches 26,28 may complete cinching (for example the reaching of a stall state) before the other one of the pair of latches 26,28, or have a slower rate of cinch than the other one of the pair of latches 26,28 due to the different sealing loading imparted by the seals e.g. 27*r*, 27*f* resisting movement of the closure member during an actuation of an associated one of the pair of latches 26, 28. Other examples of resistance 118 imparted on the link 33 in addition to those described caused by differences in seal load may be resistance created by friction, resistance created by geometries between the door and the vehicle body at different latching points, resistance caused by wear over time of components, for example a lack of grease or changes in tolerances, in cable or link slack, resistance caused by temperature variations and the variations in the link (e.g. stretching) as examples. The balancer element 42 therefore allows the links 33*a, b*, or multiple links 33, to be operated at different rates and allow a variation in the amount of travel between each link 33 and thus may vary or balance the loading applied via the links 33 to the actuatable closure device depending on the resistance experienced by an associated closure member device (e.g. cinch mechanism) or due to a difference in operating travel of the associated closure member mechanism (e.g. cinch mechanism). For example, if such a balancer element 42 was not provided to concurrently operate a pair of latches 26, 28 for cinching the closure member closed having to act against or overcome different resistances 118 such as different seal loading resistance to be overcome by an associated one of the pair of latches 26, 28 and the links 33*a, b* are fixed to be operated only at the same rate of pulling, the actuator 36 may be controlled to stop only once the last of the latches 26, 28 have been cinched for example as detected by a hall sensor or switch indicating the latch 26, 28 has been moved to the primary latching position. Should one of the latches 26, 28 be moved to primary latching position before the other one of the pair of latches 26, 28 has been moved to primary latching position, the actuator 36 may be further actuated to pull the link 33 associated with the last one of the latches 26, 28 not yet moved to primary latching position while at the same time driven to pull the link 33 associated with the one of the latches 26, 28 moved to primary latching position, that is in a cinched state, to place the one of the latches 26, 28 moved to primary latching position in an over travel position which may cause damage to such over actuated one of the pair of latches 26, 28 moved to primary latching position, to the links 33, and/or to the actuator 36 for example. The balancer element 42, 45 overcomes such an operating scenario and may also further compensate for tolerances in the system, such as slack or freeplay associated with the links 33, and/or to the actuator 36 and/or the latches 26, 28. The load balancing mechanism, and for example the load balancer element 42, 45, is configured to actuate the at least two links 33 in response to actuation of the actuator 36 and allow for a variation in the actuation travels (that is for example, each link 33 can have a travel or displacement that is different than the travel of the other link 33 in response to actuation of the actuator 36), and thus a variation in the actuation force acting on the actuatable closure device, between the at least two links 33 in response to a resistance 118 of one of the two links 33 acting on the load balancing mechanism 34, and for example the load balancer element 42, 45, being different than a resistance of the other one of the two links acting on the load balancing mechanism.

Referring to FIG. 26, shown is an example method 300 of operation of the load balancing mechanism 34 of FIGS. 2*a,b*, the load balancing mechanism for controlling concurrent operation of a pair of latches 25 of the vehicle 10 via the respective pair of links 33 connecting the pair of latches 25 to the actuator 36, the actuator 36 for sharing by the pair of latches 25. The load balancing mechanism 34 includes a lever 40 mounted at a pivot F such that the lever 40 is pivotable about the pivot F in response to actuation of the actuator 36, an actuator mounting point E on the lever 40 connecting the lever 40 to the actuator 36, the actuator 36 for rotating the lever 40 about the pivot F, and a load balancer element 42,45 mounted on the lever 40 at an axis L and rotatable about the axis L, such that each of the respective pair of links 33 is positioned on opposite sides of the axis L, said each of the respective pair of links 33 for coupling to a corresponding one of the pair of latches 25. At step 301, the actuator 36 is actuated. At step 302, the lever 40 is pivoted about the pivot F by the actuation of the actuator 36 and concurrently at step 304 rotation of the load balancer element 42,45 is performed about the axis L due to the pivoting of the lever 40, for example the load balancer element 42, 45 is allowed to be rotated due pivotal coupling to the lever 40. At step 306, the pair of latches 25 are operated concurrently by the pair of links 33 coupled to the load balancer element 42,45 as the lever 40 is pivoted.

Referring to FIG. 27, shown is an example method 400 of operation of the load balancing mechanism 34 of FIGS. 19*a,b* and 20*a,b*. The load balancing mechanism 34 also includes a disengagement lever 72 mounted to the housing 41 at a pivot 71 such that the disengagement lever 72 is pivotable about the pivot 71. The actuator 36 is coupled to the disengagement lever 72 for rotating the disengagement lever 72 about the pivot 71. A power cinch system 34*b* having a system of levers 76 is connected to the disengagement lever 72, the system of levers 76 also connected to a first cinch link 33*f* coupled to a first latch 26 and also connected to a second cinch link 33*g* coupled to a second latch 28, the first latch 26 and the second latch 28 of the pair of latches 25 and the first cinch link 33*f* and the second cinch link 33*g* of the first pair of links 33. At step 401, the actuator 36 is actuated. At step 402 the system of levers 76 is operated or otherwise manipulated by the actuator 36. At step 404, the actuation of the actuator 36 causes rotation of a sector gear 70 in order to actuate a second pair of links 33 also connected to the first latch 26 and the second latch 28 of the pair of latches 25. At step 406, the operation of the system of levers 76 causes the pair of latches 25 to be operated concurrently by the first cinch link 33*f* and the second cinch link 33*g*. For example, the power release system 34*a* is coupled to the sector gear 70, the power release system 34*a* including a secondary hook element 88 connected to the housing 41 by a second pivot 90 and connected to a second pair of links 33 also connecting the pair of latches 25 to the actuator 36, wherein the second pair of links 33 has a first power link 33*d*) coupled to the first latch 26 and a second release link 33*e* coupled to the second latch 28, such that the rotation of the sector gear 70 causes movement of the secondary hook element 88 about the second pivot 90 in order to actuate the second pair of links 33.

Now referring to FIG. 28 in addition to the previously referenced Figures, there is shown in accordance with an illustrate example a system 500 for controlling movement of a closure member, the system including the actuator 36, the at least two links 33 (illustratively shown are N links $33_a$, $33_b$, $33_n$) each operably coupled to an actuatable closure device (illustratively shown are N latches $26_1$, $26_2$, $26_n$), such as the latches 26, 28 as described hereinabove for example, for moving the closure member, for example by acting on a door 12 or on the vehicle body 9 directly such as by moving a plunger when the actuatable closure device is a door presenter mechanism or indirectly such as by moving a ratchet acting on a striker coupled to one of the vehicle door 12 and the vehicle body 9 when the actuatable closure device is a cinching latch as examples, in response to actuation (for example a pulling type actuation) of a respective one of the at least two links 33, and a load balancing mechanism 34 coupled to and interposed between the actuator 36 and the at least two links 33, the load balancing mechanism 34 configured to actuate the at least two links 33 in response to actuation of the actuator 36, for example causing a concurrent pulling of links 33 and allowing for a variation in the actuation travels 35 between the at least two links 33 in response to a resistance 118 (e.g. $\mathbf{118}_1$, $\mathbf{118}_2$, $\mathbf{118}_n$) of one of the at least two links 33 acting on the load balancing mechanism being different than a resistance of the other one of the at least two links 33 acting on the load balancing mechanism 34. The load balancing mechanism 34 includes an input 139, such as input configuration 237 as only an example, to receive an actuation force 135, such as a pulling force, from the actuator 36 acting on the load balancing mechanism 34 and at least two outputs 141, illustratively n outputs 141*n* are shown each operably coupled to one of the at least two (pair) of links 33 to distribute to the at least one pair of links 33 each a portion of the actuation force 135.

What is claimed is:

1. A load balancing mechanism controlling concurrent operation of a pair of latches of a vehicle via first and second links connecting the pair of latches to an actuator, the actuator shared by the pair of latches, the load balancing mechanism comprising:

a housing for connecting to a body of the vehicle; and a load balancer assembly movably mounted to the housing and operably interposed between the actuator and the first and second links, the load balancer assembly having an input operably coupled to the actuator to receive an actuation force from the actuator and a pair of outputs, each operably coupled to a respective one of the first and second links to distribute a respective portion of the actuation force to each of the first and second links;

wherein operation of the actuator causes operation of the load balancer assembly for driving the first and second links to cause operation of the pair of latches and wherein the actuator force is distributed differently between each of the first and second links by the load balancer assembly such that the respective portion of the actuation force for the first link is variable from the respective portion of the actuation force for the second link in response to a differential in resistance of the first and second links acting on the load balancer assembly.

2. The load balancing mechanism of claim 1, wherein the load balancer assembly is configured to allow for a variation in actuation travels between the first and second links in response to a resistance of one of the first and second links acting on the load balancer assembly being different than a resistance of the other one of the first and second links acting on the load balancer assembly.

3. The load balancing mechanism of claim 2, wherein the load balancer assembly is configured to be guided relative to said housing in response to receiving the actuation force when pivoted relative to said housing to distribute said respective portion of the actuation force to each of the first and second links.

4. The load balancing mechanism of claim 3, wherein in response to the pivoting, the load balancer assembly is configured to allow tension in each of the first and second links to equalize relative to one another, wherein the operation of the pair of latches is a cinching operation.

5. The load balancing mechanism of claim 3, the load balancer assembly including:

a lever mounted to the housing at a pivot, such that the lever is pivotable about the pivot;

an actuator mounting point on the lever at the input and connecting the lever to the actuator, the actuator for pivoting the lever about the pivot; and a load balancer element mounted on the lever at an axis and rotatable about the axis, such that each of the first and second links is positioned on opposite sides of the axis at the pair of outputs, wherein each of the first and second links couples to a corresponding one of the pair of latches;

wherein the operation of the actuator causes both pivoting of the lever about the pivot and rotation of the load balancer element about the axis while the pair of latches are operated concurrently.

6. The load balancing mechanism of claim 5, wherein rotation of the load balancer element about the axis varies in response to a loading differential imparted on the load balancer element by the first and second links while the pair of latches are operated concurrently.

7. The load balancing mechanism of claim 5, wherein the load balancer element is a pulley.

8. The load balancing mechanism of claim 5, wherein the load balancer element is an arm.

9. The load balancing mechanism of claim 5 further comprising a track of the housing for guiding the pivoting of the lever about the pivot.

10. The load balancing mechanism of claim 5, wherein each of the first and second links have different travel lengths during said operation of the actuator.

11. The load balancing mechanism of claim 5, wherein the axis on the lever is positioned between the pivot and the actuator mounting point.

12. The load balancing mechanism of claim 5, wherein the pair of latches are mounted on a door of the vehicle.

13. The load balancing mechanism of claim 12, wherein the door is a secondary door mounted to a C pillar of the vehicle.

14. The load balancing mechanism of claim 5, wherein the first and second links are cables.

15. The load balancing mechanism of claim 14, wherein the actuator is connected to the actuator mounting point by a cable.

16. The load balancing mechanism of claim 1, wherein the first and second links extend away from the load balancer assembly and within the housing without bending.

17. The load balancing mechanism of claim 1, wherein the first and second links extend from the housing at non-parallel angles relative to each other.

18. A method of operation of a load balancing mechanism, the load balancing mechanism controlling concurrent operation of a pair of latches of a vehicle via a pair of links connecting the pair of latches to an actuator, the actuator shared by the pair of latches, the method comprising the steps of:

actuating the actuator;

guiding a load balancer element in response to actuating the actuator;

allowing rotation of the load balancer element about an axis due to a differential in resistance imparted by the pair of links on the load balancer element; and operating the pair of latches concurrently by the pair of links coupled to the load balancer element during said rotation of the load balancer element;

wherein an actuation force of the actuator is variably distributed differently between each of the pair of links in response to the differential in the resistance of the pair of links acting on the load balancer element such that a respective portion of the actuation force for a first link of the pair of links is different from a respective portion of the actuation force for a second link of the pair of links.

19. A system for controlling movement of a closure member, the system including:

an actuator;

first and second links, each operably coupled to an actuatable closure device for controlling movement of the closure member in response to actuation of a respective one of the first and second links; and a load balancing mechanism coupled to the actuator and said first and second links, the load balancing mechanism configured to actuate said first and second links in response to actuation of the actuator and allow for a variation in actuation travels between said first and second links in response to a first resistance of the first link acting on the load balancing mechanism being different than a second resistance of the second link acting on the load balancing mechanism, the first link and the second link of said first and second links;

wherein an actuation force of the actuator is distributed differently between each of said first and second links, such that a first respective portion of the actuation force for the first link is different from a second respective portion of the actuation force for the second link depending on a differential in resistance represented by the first resistance and the second resistance acting on the load balancer assembly.

20. The system of claim 19, wherein the load balancing mechanism comprises an input to receive the actuation force from the actuator acting on the load balancing mechanism and a pair of outputs, each output of the pair of outputs operably coupled to a respective one of said first and second links to distribute a respective portion of the actuation force to each of said first and second links.

* * * * *